(12) United States Patent
Sakamoto

(10) Patent No.: US 6,684,634 B1
(45) Date of Patent: Feb. 3, 2004

(54) SWASH PLATE ANGLE CONTROL MECHANISM OF HYDRAULIC CONTINUOUSLY VARIABLE TRANSMISSION

(75) Inventor: Kunihiko Sakamoto, Osaka (JP)

(73) Assignee: Yanmar Diesel Engine Co., Ltd., Osaka (JP)

( * ) Notice: Subject to any disclaimer, the term of this patent is extended or adjusted under 35 U.S.C. 154(b) by 0 days.

(21) Appl. No.: 10/070,599

(22) PCT Filed: Jan. 9, 2000

(86) PCT No.: PCT/JP00/05976

§ 371 (c)(1),
(2), (4) Date: Jun. 28, 2002

(87) PCT Pub. No.: WO01/16509

PCT Pub. Date: Mar. 8, 2001

(30) Foreign Application Priority Data

Sep. 1, 1999 (JP) ............................................. 11/247740
Oct. 14, 1999 (JP) ........................................... 11/291862

(51) Int. Cl.[7] ............................................... F16D 31/02
(52) U.S. Cl. ......................................... 60/444; 92/12.2
(58) Field of Search ..................... 60/443, 444; 92/12.2

(56) References Cited

U.S. PATENT DOCUMENTS 3,708,978 A * 1/1973 Reiff et al. .................... 60/443
5,398,505 A * 3/1995 Oogushi et al. .............. 60/444
5,836,159 A * 11/1998 Shimizu et al. ............. 92/12.2

FOREIGN PATENT DOCUMENTS

| JP | 55146288 | 11/1980 |
|---|---|---|
| JP | 63-2331 | 1/1988 |
| JP | 5-87364 | 11/1993 |
| JP | 8-2522027 | 10/1996 |
| JP | 10-2585276 | 9/1998 |
| JP | 11-107910 | 4/1999 |
| JP | 11-247755 | 9/1999 |

\* cited by examiner

Primary Examiner—Edward K. Look
Assistant Examiner—Michael Leslie
(74) Attorney, Agent, or Firm—Knobbe, Martens, Olson & Bear LLP

(57) ABSTRACT

In a configuration comprising a hydraulic servo mechanism (6) having a spool (72) as a hydraulic valve for controlling the swash plate angle disposed within a body housing (3) of a hydraulic continuously variable transmission (1 or 2), and a manual operation member (20) for operating the hydraulic servo mechanism disposed outside of the body housing, a casing (33) is provided between the manual operation member and the body housing, a neutral position holding mechanism (11) for holding the neutral position of a movable swash plate and a rotation control mechanism (34) for controlling the maximum rotating angle of the movable swash plate are installed in the casing, and further an over-stroke absorbing mechanism (27, 40) for absorbing the over-stroke of the manual operation member is installed in an area ranging from the inside of the casing to the inside of the body housing, and moreover a spool operating member (41) moving by operation of the manual operation member is disposed movably almost integrally with the spool.

14 Claims, 24 Drawing Sheets

SWASH PLATE ANGLE CONTROL MECHANISM OF HYDRAULIC CONTINUOUSLY VARIABLE TRANSMISSION

This application is the U.S. National Phase under 35 U.S.C. §371 of International Application PCT/JP00/05976, filed Sep. 1, 2000, which claims priority to Japanese Patent Application No. 11/247740, filed Sep. 1, 1999, and No. 11/291862, filed Oct. 14, 1999. The International Application was published under PCT Article 21(2) in a language other than English.

TECHNICAL FIELD

The present invention relates to a hydraulic servo mechanism for controlling a movable swash plate of a hydraulic continuously variable transmission of swash plate type composed by fluid coupling between a hydraulic pump and a hydraulic motor.

BACKGROUND ART

Hitherto, in a hydraulic continuously variable transmission composed of a hydraulic pump and a hydraulic motor, for example, the hydraulic pump is composed in a variable displacement type, and the displacement of the hydraulic pump is adjusted by controlling the slant angle of movable swash plate of the hydraulic pump by way of a hydraulic servo mechanism provided in the hydraulic continuously variable transmission.

This servo mechanism is manipulated by an operation lever attached to the outside of the hydraulic continuously variable transmission. This operation lever is, when the hydraulic continuously variable transmission is employed, for example, in a mobile vehicle, coupled and linked to a running speed change lever to be manually manipulated by the driver disposed in the cabin of the vehicle by means of a link mechanism or the like. The movable swash plate is coupled to a hydraulic piston of the hydraulic servo mechanism, and a spool as a hydraulic valve for controlling the supply of pressure fluid to both hydraulic chambers at both sides of the hydraulic piston is moved by manipulating the operation lever.

However, together with the operation lever, a neutral position holding mechanism, which holds a spool operating part at a position corresponding to a neutral position of the movable swash plate so as to hold the movable swash plate at the neutral position, a rotation limiting mechanism, which limits the move of the spool operating part so as to define the maximum rotating angle of the movable swash plate, and an over-stroke absorbing mechanism, which is constituted on a pivot portion of the operation lever so as to absorb the over-stroke of the operation lever manipulated beyond the moving limit of the spool operating, are disposed outside of the hydraulic continuously variable transmission. Therefore, in such configuration, various troubles were experienced, such as malfunction due to mud, dust or foreign matter sticking to the constituent members of these mechanisms, or deviation of adjustment due to impact from outside. Besides, together with the hydraulic continuously variable transmission, spaces for disposing these mechanisms are needed, and as a result the equipment is increased in size, it is hard to keep space for installation, and the cost is higher.

Further, some of the conventional hydraulic servo mechanisms for control of movable swash plate position comprise, aside from the manual hydraulic control mechanism for operating the spool by the operation lever as mentioned above, also an automatic hydraulic control mechanism as a solenoid valve for supplying pressure fluid to both hydraulic chambers at both sides of the piston.

The piston and the both pressure chambers are usually disposed in the vertical direction at a side of hydraulic pump or hydraulic motor having a movable swash plate coupled to the piston, and the solenoid valve is also disposed above or beneath the housing portion for enclosing the both hydraulic chambers, and therefore the entire equipment is large in size. Further, it required a considerable hydraulic pressure in order to drive the piston hydraulically by supplying pressure fluid directly into the both hydraulic chambers at both sides of the piston without passing through the spool as mentioned above, and an exclusive solenoid valve of a corresponding large capacity was used, which also added to the cost.

SUMMARY OF THE INVENTION

The hydraulic continuously variable transmission of the invention comprises a hydraulic servo mechanism for controlling the swash plate angle disposed within its body housing, and a manual operation member for operating the hydraulic servo mechanism disposed outside of the body housing, wherein a casing is provided between the manual operation member and the body housing, and wherein a neutral position holding mechanism for holding the neutral position of a movable swash plate and a rotation control mechanism for controlling the maximum rotating angle of the movable swash plate are installed in the casing. Further, an over-stroke absorbing mechanism for absorbing the over-stroke of the manual operation member is installed in an area ranging from the inside of the casing to the inside of the body housing.

In this configuration, the constituent members of the neutral position holding mechanism, rotation control mechanism and over-stroke absorbing mechanism are protected by the casing or body housing, and are not contaminated by mud, dust or foreign matter, and occurrence of malfunction or deviation of adjustment due to impact from outside can be prevented. Each mechanism can be designed in a small size, and the cost can be reduced.

Also in this configuration, the hydraulic servo mechanism has a spool as a hydraulic valve, and a spool operating member moving from the inside of the casing to the inside of the body housing by operation of the manual operation member is disposed movably almost integrally with the spool.

In a first aspect of the neutral position holding mechanism of the invention, a positioning member of a nearly same width as the spool operating member is disposed in the casing, and both the positioning member and the spool operating member are clamped from both sides by a pair of pressing members receiving biasing forces in mutually opposite directions, so that the spool operating member is held at a position corresponding to the neutral position of the movable swash plate. Thus, in a simple and small structure, as for neutral position regulation, the neutral position holding mechanism capable of adjusting the position of the positioning member is presented.

In the first aspect of the neutral position holding mechanism, the pressing member receives a spring biasing force, and serves as a spring retainer free to move forward or backward with respect to the positioning member, and it is no longer necessary to receive the spring biasing force with a stop ring or other additional member, that is, risk of dislocation of stop ring is eliminated, so that the durability is enhanced. At the same time, the precision of neutral position holding is enhanced.

Receiving the spring biasing force, this pressing member works as a spring retainer that is free to move forward or backward with respect to the positioning member.

Constituent members of the neutral position holding mechanism also include a rod having this positioning member, and the pressing member is disposed movably along the axial center direction of the rod, and a step abutting against the pressing member is formed in the rod so as to define the move of the pressing member in a direction remote from the positioning member by resisting the biasing force, so that the rotation control mechanism is composed. As a result, the maximum rotating angle of the movable swash plate from the neutral position can be accurately set, the durability is improved and a high precision can be maintained for a long period. Besides, since the position precision of the step is determined by the mechanical processing precision when machining the rod, it is not necessary to adjust the rotation control mechanism after assembling the rod into the casing and adjusting the neutral position, and therefore, for example, the adjusting step before shipping can be omitted.

In the neutral position holding mechanism, usually, the rod is fixed in position, and when adjusting the position of the positioning member at the time of clamping at both pressing members by the biasing force from both sides, the rod can be moved in the axial center direction by operation from outside of the casing. Therefore, the neutral position can be adjusted only by operating the rod without having to disassemble the neutral position holding mechanism, so that the neutral position can be adjusted easily.

The casing is filled with fluid, and in each spring retainer, an orifice may be formed for passing fluid between the disposing space of each spring and the disposing space of the positioning member. By this orifice, a damper action can be obtained when manipulating the manual operation member. That is, when the manual operation member is handled slowly, the manual operation member can be turned with a small effort, and the slant angle of the movable swash plate can be manipulated. When the manual operation member is moved suddenly, a large force is required to turn the manual operation member, and it is hard to manipulate the slant angle of the movable swash plate, so that occurrence of shock due to sudden operation of the manual operation member can be suppressed.

Alternatively, the neutral position holding mechanism can be formed integrally as a cartridge, and may be detachably installed in the casing. This configuration facilitates adjustment of neutral position and maintenance of the neutral position holding mechanism. Further, the neutral position holding mechanism can be reduced in size, and the cost is much lowered.

In a second aspect of the neutral position holding mechanism of the invention, the casing is filled with pressure fluid, and a solenoid proportional valve is disposed in the casing, so that the move of the spool operating member may be controlled by the supply control of pressure fluid to the neutral position holding mechanism by the solenoid proportional valve. That is, as the hydraulic servo mechanism for controlling the swash plate angle for enabling automatic control, hydraulic control of the neutral position holding mechanism is utilized. Therefore, in addition to manual operation, the hydraulic servo mechanism having an electronic control function realizing control of higher precision can be assembled in a compact design. Still more, for the hydraulic control valve serving as automatic swash plate control mechanism which does not drive directly the spool of the hydraulic servo mechanism as in the prior art but requires only a capacity enough for hydraulic control of spool operating member through the neutral position holding mechanism, a solenoid proportional valve of commercial class can be used, so that the cost can be saved. If either the manual operating mechanism or electronic control function fails to operate due to trouble or other cause, the operation can be continued by the other one.

For a first example of the neutral position holding mechanism of the second aspect which moves the spool operating member as being controlled by the solenoid proportional valve, in the casing, a piston fitting the spool operating member is disposed and a pair of biasing members are disposed therein at both sides of the piston respectively. The piston is held by the biasing forces of the pair of biasing members from both sides so as to hold the spool operating member at a position corresponding to the neutral position of the movable swash plate. A pair of the solenoid proportional valves are provided so as to control supply of pressure fluid to the respective hydraulic chambers at both sides of the piston.

Further, for a second example of the neutral position holding mechanism of the second aspect which moves the spool operating member as being controlled by the solenoid proportional valve, in the casing, a piston fitting the spool operating member is disposed, a biasing member is disposed at one side of the piston, and a hydraulic chamber is formed at the other side of the piston. The sole solenoid proportional valve controls the supply of pressure fluid to the hydraulic chamber. Therefore, the piston is held by equilibrium between the biasing force of biasing member at one side and the oil pressure of the pressure fluid at the other side, so that the spool operating member may be held at a position corresponding to the neutral position of the movable swash plate.

Moreover, guide means may be provided to prevent the piston from turning and guide the piston so as to move only along its axial center direction. As a result, moment is not applied to a pin serving as the spool operating member from the piston, and friction can be reduced in the portion of the pin contacting with other member on the outer circumference, so that the pin may slide smoothly.

The spool operating member such as a pin may be disposed integrally with the piston. In this case, it is effective to eliminate deviation in the sliding direction occurring in the fitting parts of the piston and pin or deviation due to rotation around the axis, and hence the transmission efficiency of operating force is enhanced. By integrating the pin and piston, further, the strength as a rigid body is also heightened.

The hydraulic servo mechanism in a configuration for hydraulically controlling the spool operating member by the solenoid proportional valve through such neutral position holding mechanism is used for controlling both the movable swash plate angles of the hydraulic pump and hydraulic motor in the case that the hydraulic pump and hydraulic motor of the hydraulic continuously variable transmission are both of variable displacement type. A wide speed variable range of the hydraulic continuously variable transmission is assured, and control of high precision is realized.

These and other objects, features and effects of the invention will be fully apparent from the following description taken in conjunction with the accompanying drawings.

BEST MODE FOR CARRYING OUT THE INVENTION

Figure 1:
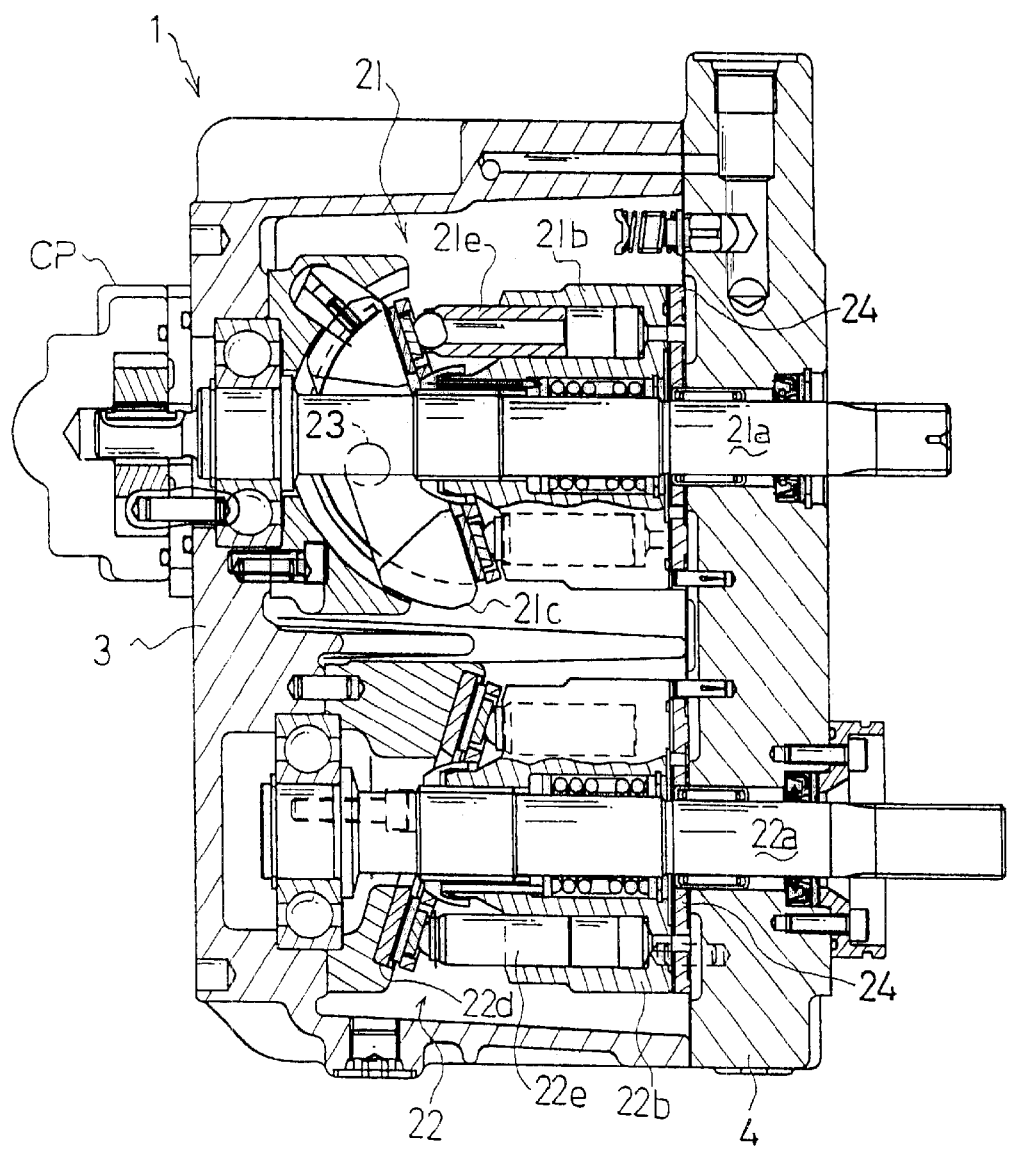
FIG. 1 is a sectional side view showing a hydraulic continuously variable transmission (HST 1) in which only a hydraulic pump is of variable displacement type, out of the hydraulic continuously variable transmissions employing a hydraulic servo mechanism 6 for controlling the swash plate angle according to the invention.
Figure 2:
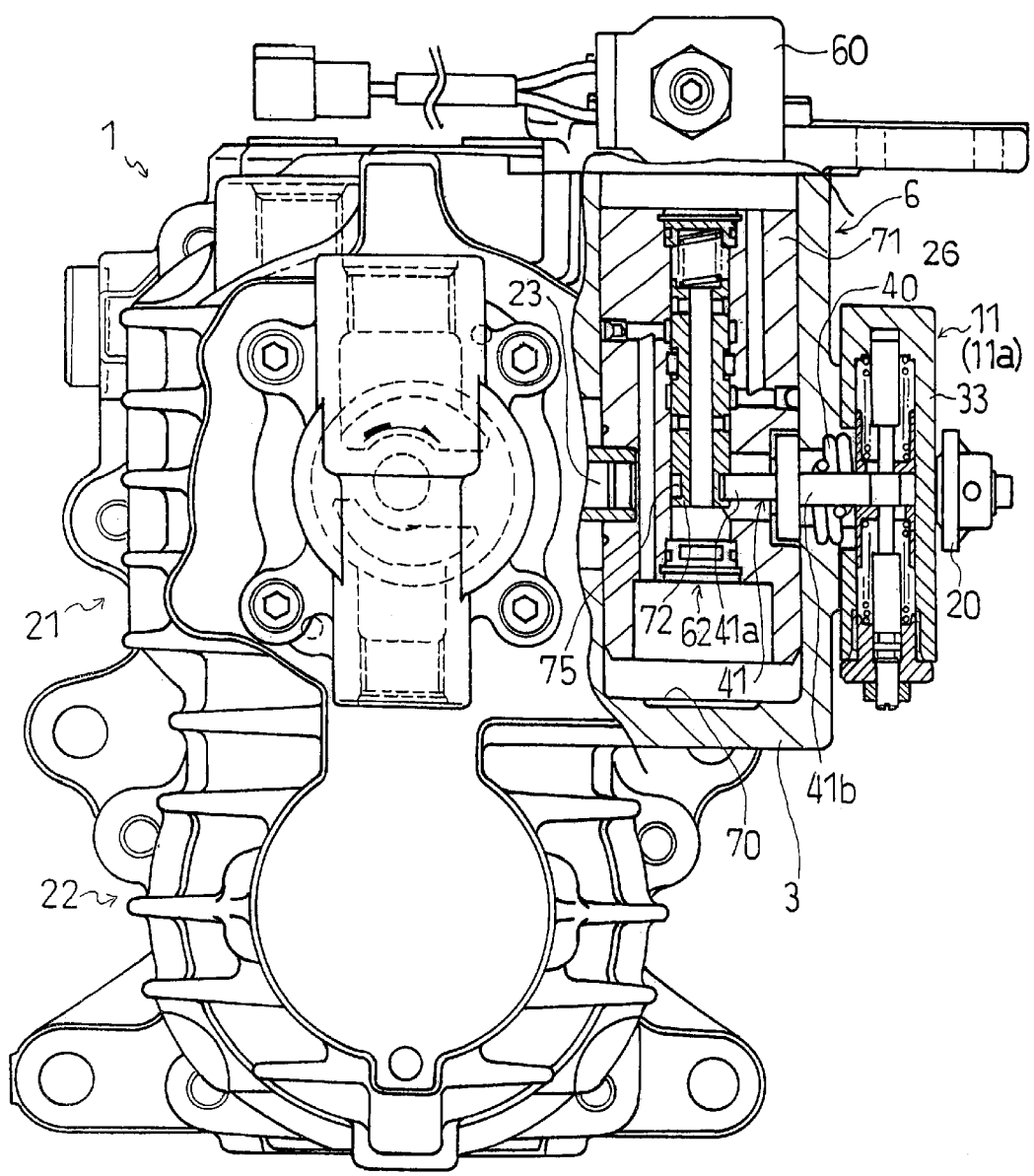
FIG. 2 is a front view partly in section of the same.

As shown in FIG. 1 and FIG. 2, a hydraulic pump 21 and a hydraulic motor 22 of a hydraulic continuously variable transmission (HST) 1 are incorporated in a housing (body housing) 3, and disposed on the same plane with an oil path plate 4.

The variable displacement type hydraulic pump 21 is composed of a drive shaft 21*a*, a cylinder block 21*b* in which the drive shaft 21*a* is inserted for rotating together with the drive shaft 21*a*, a valve plate 24 through which the drive shaft 21*a* is passed interposed between the cylinder block 21*b* and the oil path plate 4, plungers 21*e* slidably inserted in the cylinder block 21*b*, and a movable swash plate 21*c* tiltably supported in the housing 3 for contacting with all plungers 21*e*.

The movable swash plate 21*e* defines the sliding amount of the plunger 21*e*, and adjusts the discharge of working fluid of the variable displacement type hydraulic pump 21. In the oil path plate 4, an oil path not shown is provided, and working fluid is supplied from the variable displacement type hydraulic pump 21 into the hydraulic motor 22 through the oil path.

The hydraulic motor 22 is composed of, like the variable displacement type hydraulic pump 21, an output shaft 22a inserted into the oil path plate 4 and rotatably supported by the housing 3 at one end, a cylinder block 22b in which the output shaft 22a is inserted for rotating together with the output shaft 22a, a valve plate 24 through which the output shaft 22a is passed interposed between the cylinder block 22b and the oil path plate 4, plungers 22e slidably inserted in the cylinder block 22b, and a fixed swash plate 22d fixed in the housing 3 for contacting with heads of all the plungers 22e.

In this configuration, when driving force of an engine is put into the drive shaft 21a, the hydraulic pump 21 is driven, and the working fluid discharged by drive of the hydraulic pump 21 is supplied into the hydraulic motor 22 through the oil path plate 4, and as the working fluid flows in and out, the hydraulic motor 22 is driven, and the driving force of the hydraulic motor 22 is transmitted to the output shaft 22a.

In the HST 1 having such configuration, the hydraulic pump 21 and hydraulic motor 22 are disposed in upper and lower positions, and a charge pump CP is attached to the front end of the input shaft 21a of the hydraulic pump 21.

Further, at one side of the hydraulic pump 21, as shown in FIG. 2, a hydraulic servo mechanism 6 is disposed. The hydraulic servo mechanism 6 is composed of an automatic swash plate angle control valve 61 provided on the top of the hydraulic pump 21, a piston 71, and a manual swash plate angle control valve 62 having a spool 72 disposed inside of the piston 71, and is buried inside of the housing 3 of the HST 1.

The configuration of the hydraulic servo mechanism 6 is explained in detail by referring mainly to FIG. 2. As mentioned above, the hydraulic servo mechanism 6 is composed of the automatic swash plate angle control valve 61 and manual swash plate angle control valve 62, and as shown in FIG. 2, at a side of the movable swash plate 21c of the hydraulic pump 21, a cylinder chamber 70 is formed in the housing 3, and the piston 71 is put in the cylinder chamber 70, a pin 23 projecting from a side of the movable swash plate 21c is fitted to a side of the piston 71, a penetration hole is opened in the axial center of the piston 71, and a spool 72 is slidably fitted in this penetration hole.

In the piston 71, there is an oil path communicating with the upper part and lower part of the cylinder chamber 70, and the oil path is opened or closed by the sliding motion of the spool 72, and pressure fluid is sent to hydraulic chambers above and beneath the piston 71, so that the piston 71 slides in the vertical direction.

Figure 3:
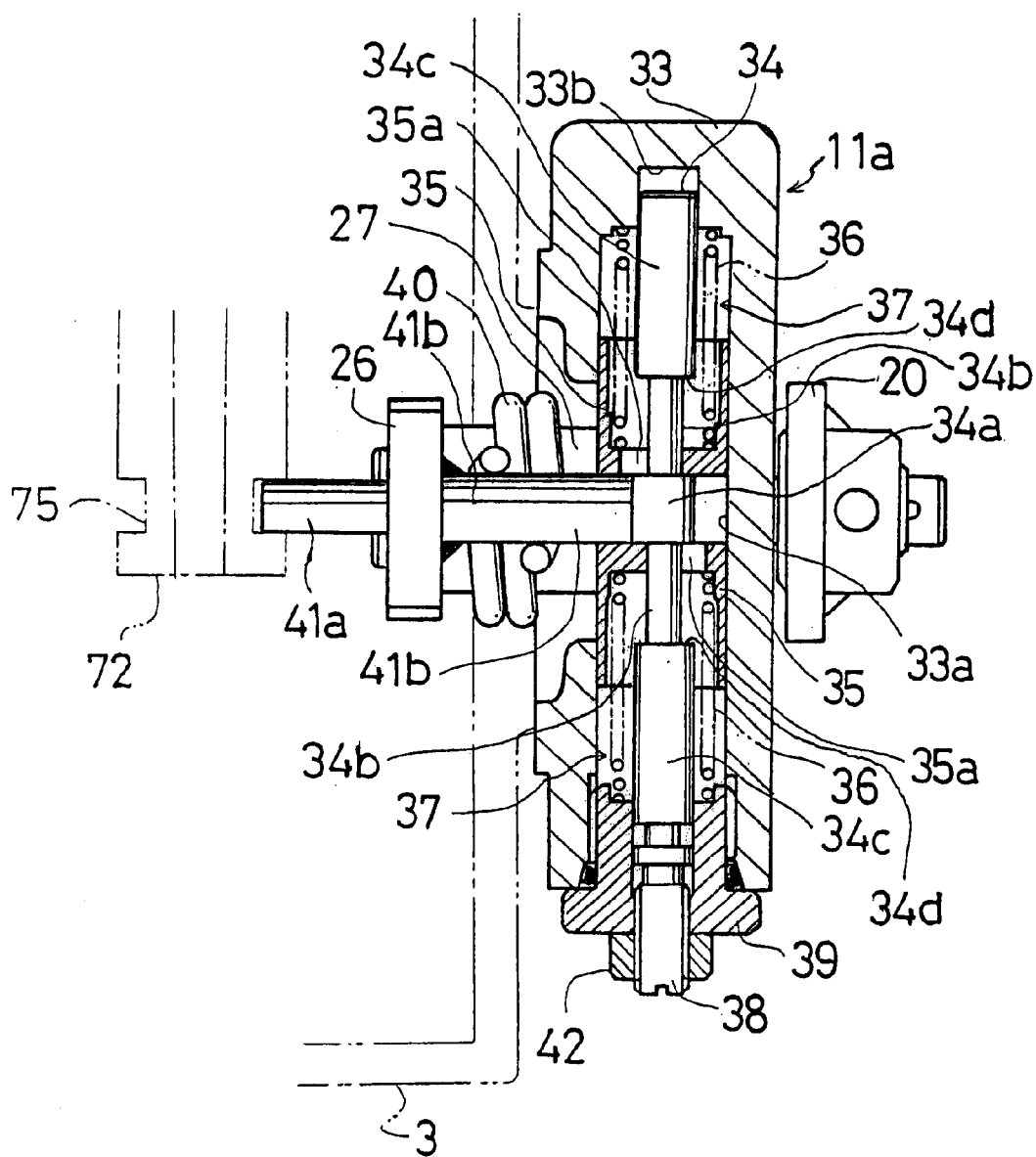
FIG. 3 is a sectional front view of a neutral position holding mechanism 11*a* shown in FIG. 2, for supporting an operation lever 21 as a manual operation member, and holding the spool of the hydraulic servo mechanism 6, disposed in a casing 33 attached to a housing 3 of the HST 1, at a neutral position.
Figure 4:
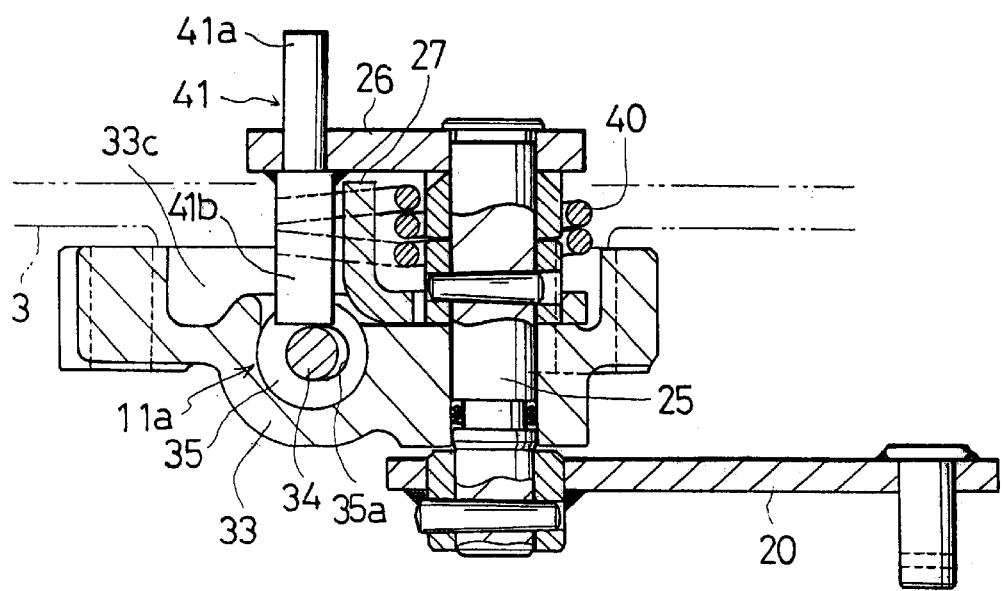
FIG. 4 is a sectional plan view of the neutral position holding mechanism 11*b* disposed in the casing 33, and an over-stroke absorbing mechanism disposed between the insides of the casing 33 and the housing so as to be interposed between the operation lever 21 and the pin 41 serving as a spool operating member.

As shown in FIG. 4 or else, a pin (spool operating member) 41 continuously forming first pin portion 41a and second pin portion 41b different in diameter is inserted and fixed in a support arm 26 described below. As shown in FIG. 2 and FIG. 3, the first pin portion 41a projecting one side from the support arm 26 is inserted into the housing 3 through an opening 71a opened in a sufficient size at the side of the piston 71 so as to allow oscillation of the first pin portion 41a owing to operation of the operation lever 20 explained below, and its leading end is inserted into a fitting groove 75 formed in the lower outer circumference of the spool 72. The second pin portion 41b projecting in the opposite direction of the first pin portion 41a from the support arm 26 is held by a torsion spring 40.

Figure 6:
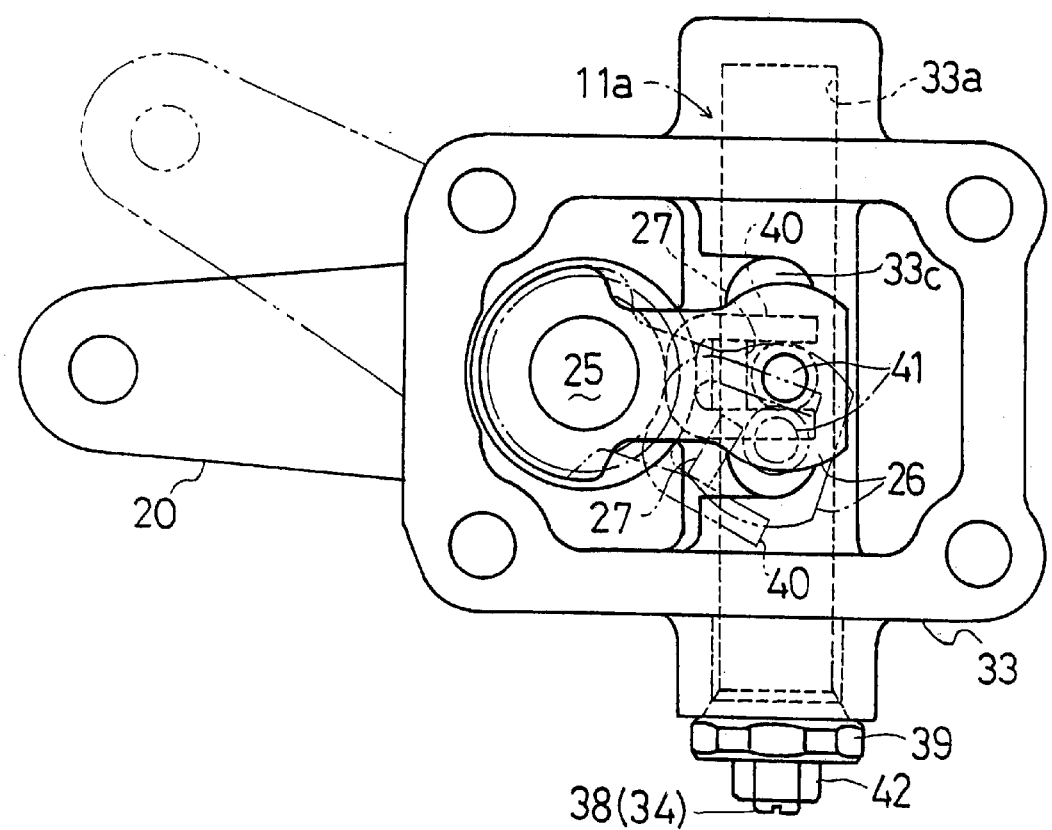
FIG. 6 is a side view of the same from its opposite side (housing 3 side)

By operating the torsion spring 40 by turning the operation lever 20 of the hydraulic servo mechanism 6, as shown in FIG. 6, the support arm 26 and pin 41 oscillate about a rotation fulcrum shaft 25 mentioned below, that is, the pin 41 revolves about the rotation fulcrum shaft 25 so as to move the spool 72 vertically. Thus, by the spool 72, the manual swash plate angle control valve 62 is composed, and as the spool 72 oscillates vertically, the pressure fluid flows above or beneath the piston 71, so that the piston 71 is moved up or down.

Further, as shown in FIG. 2, the automatic swash plate angle control valve 60 is composed of solenoid valve. The load of the engine for supplying power to the drive shaft 21a of the HST 1 and the load of wheels and others are detected by detecting means such as sensors, and the automatic swash plate angle control valve 60 is changed over depending on the detected values so as to supply pressure fluid to above or beneath the piston 71, thereby changing the vertical position of the piston 71.

In this manner, by the automatic swash plate angle control valve 60 or manual swash plate angle control valve 62, the piston 71 is finally moved up or down, and the pin 23 fixed to the piston 71 is moved up or down, so that the movable swash plate 21c of the hydraulic pump 21 coupled to the pin 23 is rotated, thereby changing the rotating direction and rotating speed of the output shaft 22a of the HST 1.

The interlocking mechanism relating to manual swash plate angle control from the operation lever 20 to the spool 72 will now be explained. As shown in FIG. 2, FIG. 3, or else, the casing 33 is installed outside of the housing 3 of the HST 1, and the rotation fulcrum shaft 25 is rotatably supported in the casing 33, and the base end of the operation lever 20 is fixed at one end of the rotation fulcrum shaft 25 projecting outside from the casing 33. The rotation fulcrum shaft 25, as shown in FIG. 4, projects from the casing 33 at the opposite side of the disposing side of the operation lever 20, while the other end thereof is inserted into the housing 3, and a support arm 26 integrally incorporating the pin 41 is rotatably fitted to the end of the rotation fulcrum shaft 25 in the housing 3.

Between the casing 33 and support arm 26, an interlocking arm 27 is fixed on the rotation fulcrum shaft 25, and the torsion spring 40 is wound thereon. Both ends of the torsion spring 40 are bent upward so as to clamp the interlocking arm 27 together with the second pin portion 41b of the pin 41 fixed on the support arm 26, as shown in FIG. 4 and FIG. 6.

When the operation lever 20 is turned, as shown in FIG. 6 or else, the interlocking arm 27 fixed on the rotation fulcrum shaft 25 and the torsion spring 40 clamping the interlocking arm 27 are integrally put in rotation. Further, the pin 41 revolves about the rotation fulcrum shaft 25 through the support arm 26 as being held by the torsion spring 40, so that the spool 72 is moved up or down.

While the operation lever 20 is not rotated, the pin 41 is held at a position corresponding to the neutral position of the movable swash plate 21c, and after being rotated, when the operating force applied on the operation lever 20 is loosened, it is desired to be composed so as to return to the position corresponding to the neutral position of the movable swash plate 21c. To realize this configuration, the neutral position holding mechanism 11 is composed in the casing 33 supporting the rotation fulcrum shaft 25 of the operation lever 20.

As an example of this neutral position holding mechanism 11, referring to FIG. 2 to FIG. 6, the neutral position holding mechanism 11a comprising both rotation control mechanism and later-discussed over-stroke absorbing mechanism of the invention will now be explained.

As shown in FIG. 3, a cylinder chamber 33a opened at one end is formed in the casing 33, at a position offset back and forth to the rotation fulcrum shaft 25, with its longitudinal direction orthogonal to the rotation fulcrum shaft 25. In the cylinder chamber 33a, a detent rod 34 is provided oscillatably in its longitudinal direction (vertical direction in FIG. 3), and one end of the detent rod 34 is supported in a support recess 33b formed at the closed end of the cylinder chamber 33a formed in the casing 33, and the other end thereof is supported by a cap 39 screwed into the open end of the cylinder chamber 33a of the casing 33. As mentioned below, the detent rod 34 is intended to move in the axial center direction in order to adjust the position of a middle detent 34a, and the length of the support recess 33b is set so as to allow its move.

Female threads are formed in the cap 39, and engaged with an adjusting screw shaft 38 formed at one end of the detent rod 34. A lock nut 42 is usually fitted to the portion of adjusting screw shaft 38 projecting outside from the cap 39 and is tightened to the outer end of the cap 39 to be fixed in position. By loosening the lock nut 42 and rotating the adjusting screw shaft 38, the detent rod 34 can be moved in its longitudinal direction.

Figure 5:
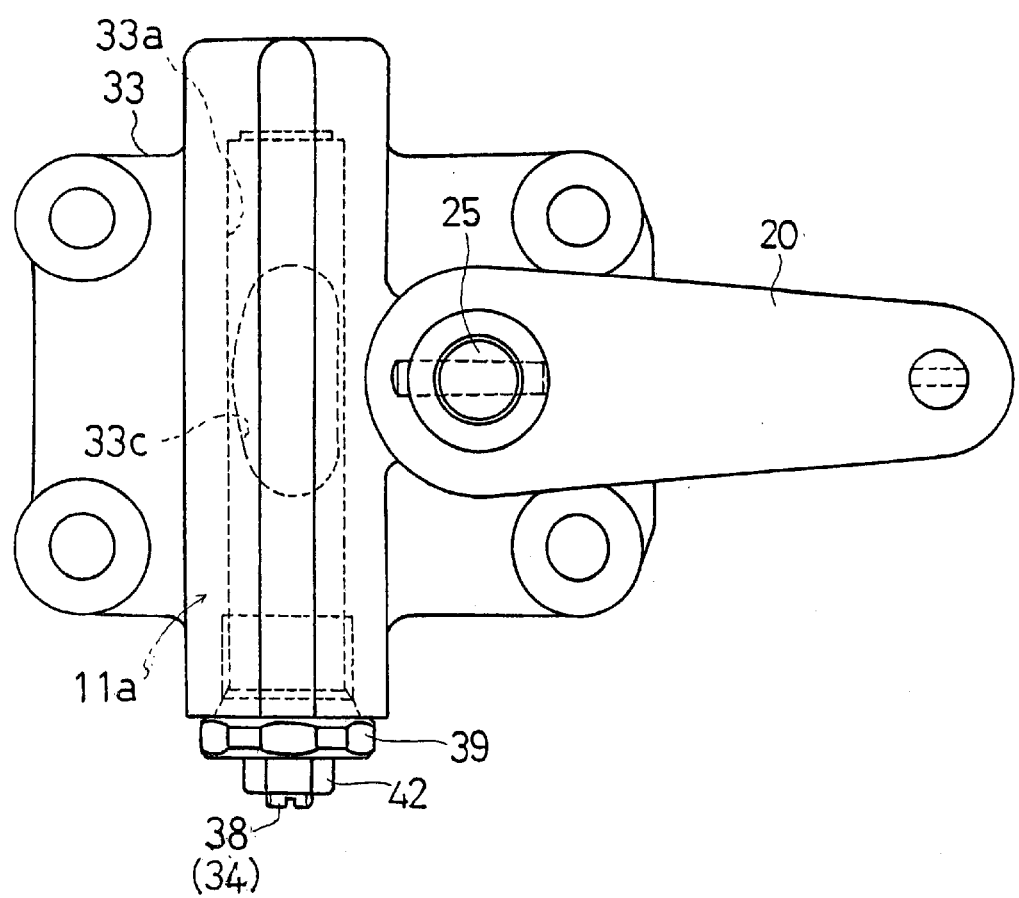
FIG. 5 is a side view of the casing 33 supporting the operation lever 21 and incorporating the neutral position holding mechanism 11*a*.

On the confronting side of the casing 33 to the housing 3, as shown in FIG. 5 and FIG. 6, a communication hole 33c is opened, and as shown in FIG. 3 or else, the leading end of the second pin portion 41b of the pin 41 held by the torsion spring 40 is inserted into the cylinder chamber 33a by way of the communication hole 33c. Nearly in the center of the detent rod 34, a middle detent 34a (positioning part) of a length nearly same as the diameter of the second pin portion 41b is formed, and the second pin portion 41a is positioned so as to be close to the middle detent 34a, and is inserted into the casing 33.

In this example, the middle detent 34a is formed integrally with the detent rod 34, but it may be formed integrally with the casing 33 so that the cost may be saved (however, if the middle detent is formed in such manner, the position of the middle detent 34a cannot be adjusted in the same manner). Or, the middle detent 34a may be separately formed, and may be fitted to the detent rod 34 or casing 33.

Further, in the cylinder chamber 33a of the casing 33, spring retainers 35 are respectively provided at both sides of the middle detent 34a of the detent rod 34 slidably in the axial center direction of the detent rod 34. In this cylinder chamber 33a, the space between one spring retainer 35 (the upper one in FIG. 3) and the closed end of the cylinder chamber 33a, and the space between the other spring retainer 35 (the lower one in FIG. 3) and the cap 39 are formed as spring chambers 37. In each spring chamber 37, by a spring 36 interposed between the casing 33 and spring retainer 35, and a spring 36 interposed between the cap 39 and spring retainer 35, both the spring retainers 35 are biased toward the middle detent 34a, and in the initial state (that is, when the pin 41 is at a position corresponding to the neutral position of the movable swash plate 21c), the middle detent 34a of the detent rod 34 and the second pin portion 41b of the pin 51 are clamped by both the spring retainers 35 from the both sides (upper and lower side in this embodiment).

The both spring retainers 35 for clamping the pin 41 and middle detent 34a from both sides are guided by the casing 33 composed of a rigid block member on the outer circumference, so that the pin 41 can be positioned precisely.

In each spring retainer 35, a mounting hole 35a for passing the detent rod 34 is formed. The mounting hole 35a has an opening larger than the outside diameter of the middle detent 34a of the detent rod 34, and this opening is formed at a position eccentric from the axial center of the positioned detent rod 34.

Figure 7:
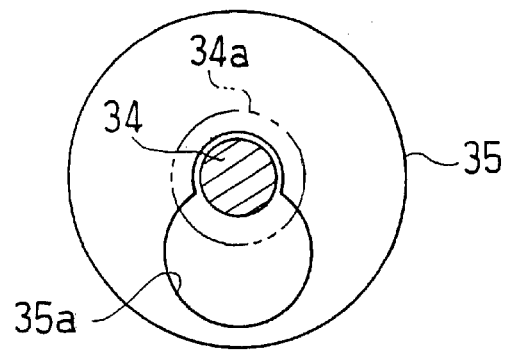
FIG. 7 is a plan view of a spring retainer 35 having an eccentric mounting hole 35*a* as an example.

For example, the mounting hole 35a shown in FIG. 7 is shaped like a tumbler coupling two circular holes of large and small diameter, and the smaller circular hole is for inserting each small end 34b formed at both sides of the middle detent 34a of the dent rod 34 after positioning, and the larger circular hole is at a position eccentric from the axial center of the detent rod 34, and has a larger diameter than the outside diameter of the middle detent 34a, and when detaching the detent rod 34 from the casing 33 or attaching, the detent rod 34 is deviated from the axial center at the time of positioning, so that the detent rod 34 can be inserted or removed from this large hole. After assembling the neutral position holding mechanism 11a, that is, after positioning the detent rod 34, the spring retainer 35 can be fixed on the middle detent 34a without using a stop ring or other additional member, and therefore the number of parts can be curtailed and the reliability can be enhanced.

Figure 8:
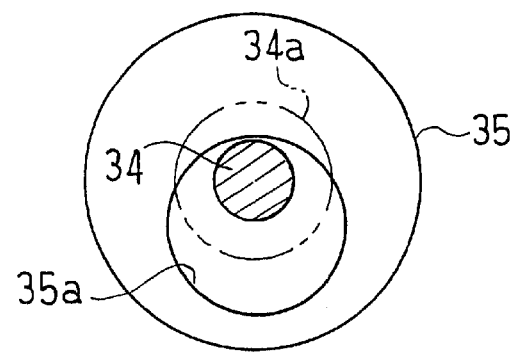
FIG. 8 is a plan view of the spring retainer 35 having the eccentric mounting hole 35*a* as another example.

A mounting hole 35a shown in FIG. 8 is a circular hole having an aperture larger than the outside diameter of the middle detent 34a, and its central position is deviated from the axial center of the detent rod 34 after positioning, but the small end 34b of the detent rod 34 after positioning is inserted in this mounting hole 35a shown in FIG. 8. When detaching or attaching the detent rod 34, same as in the case of the mounting hole 35a in FIG. 7, the detent rod 34 is deviated from the axial center at the time of positioning, so that the detent rod 34 can be inserted or removed through this mounting hole 35a.

By thus forming the mounting hole 35a, the assembling work and maintenance work of the neutral position holding mechanism 11a may be easier.

Figure 9:
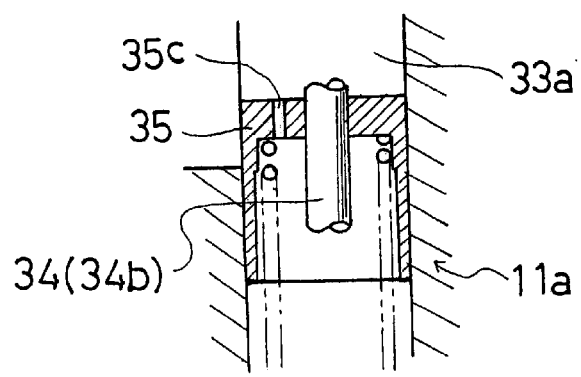
FIG. 9 is a fragmentary sectional front view of the casing 33 and the spring retainer 35 having an orifice 35*c* disposed therein.

A mounting hole 35a of the spring retainer 35 shown in FIG. 9 has a minimum required aperture for inserting the small end 34b of the detent rod 34 movably in the axial center direction, so that the detent rod 34 cannot be detached or attached by its deviating from the axial center thereof after positioning as in the above case. However, by positioning the detent rod 34 before mounting the spring retainer 35, the spring retainer 35 can be positioned while moving along the axial center of the detent rod 34.

Including the both spring chambers 37, the cylinder chamber 33a is filled with working pressure fluid for the HST 1 in the housing 3 through the communication hole 33c, thereby enhancing the wear resistance of the piston 34 and others in the cylinder chamber 33.

However, the oil pressure of the pressure fluid charged in each spring chamber 37 should not impede the operation of the spring retainers 35. In the embodiment shown in FIG. 3, the pressure fluid flows through the mounting hole 35a of eccentric shape formed in the spring retainer 35 as shown in FIG. 7 or FIG. 8, and therefore the spring retainer 35 pressed by the second pin portion 41b of the pin 41 moving along the turning operation of the operation lever 20 will not be disturbed by the pressure oil in the spring chamber 37.

In the spring retainer 35 shown in FIG. 9, an orifice 35c is formed. When the spring retainer 35 slides in the axial center direction of the detent rod 34, if the spring retainer 35 slides suddenly, the passing resistance increases when the pressure fluid passes through the orifice 35c, and a large force is required for sliding the spring retainer 35 due to the oil pressure resistance in the spring chamber 37 in which the spring 36 is disposed for biasing the spring retainer 35. When sliding the spring retainer 35 slowly, the passing resistance of the pressure fluid in the orifice 35c is small, and the oil pressure is released in the spring chamber 37 at the sliding spring retainer 35 side, so that a small force is enough to slide the spring retainer 35.

That is, the orifice 35 has a damper action, and when manipulating the operation lever 20 slowly, the operation lever 20 can be turned by a small force so as to change the swash plate angle of the movable swash plate 21c. If attempted to manipulate the operation lever 20 abruptly, a very large force is required to turn the operation lever 20 suddenly, and it is difficult to manipulate the swash plate angle of the movable swash plate 21c, so that occurrence of shock due to abrupt manipulation of operation lever 20 can be suppressed.

Alternatively, the orifice having such function may be formed of the area of the casing 33 formed as the spring chamber 37, so as to bring the spring chamber 37 and housing 3 into communication with each other therethrough.

Or, by forming a groove parallel to the axial center direction of the detent rod 34 on the outer circumference of the spring retainer 35, the spring chamber 37 and communication hole 33c may communicate with each other.

In this manner, the orifice can be formed easily in a simple structure. Depending on the case, if the opening area other than the inserting portion of the detent rod 34 after positioning of the mounting hole 35a composed as shown in FIG. 7 or FIG. 8 is small enough to function as orifice, it may have the same action as the orifice 35c.

Further, in order that the movable swash plate 21c held by the neutral position holding mechanism 11a may be positioned accurately at its neutral position, the neutral position holding mechanism 11a is provided with a neutral position adjusting mechanism, which will now be explained.

The second pin portion 41b of the pin 41 is held in a state enclosed by two spring retainers 35, together with the middle detent 34a of the detent rod 34 being positioned and fixed. While the pin 41 is held at this position (that is, the positions of the spool 72 and the piston 71 hydraulically controlled by the spool 72 at this time), the movable swash plate 21c of the hydraulic pump 21 must be at the neutral position.

While the pin 41 positioned to the middle detent 34a is held between the both spring retainers 35, if the movable swash plate 21c is deviated from its neutral position, the lock nut 42 is loosened and the adjusting screw shaft 38 is rotated so as to adjust the position of the middle detent 34a of the detent rod 34 in the axial center direction of the detent rod 34. Therefore, the position of the middle detent 34a, when being enclosed together with the pin 41 by the both spring retainers 35, may be adjusted so that the movable swash plate 21c may be positioned at the neutral position.

Thus, the neutral position holding mechanism 11a has an adjusting mechanism for fine adjustment of neutral position. This neutral position adjusting mechanism is designed to adjust the neutral position by rotating the adjusting screw shaft 38 which projects outside, without having to disassemble the neutral position holding mechanism 11a, and therefore the neutral position can be adjusted from outside, and the adjustment work is easy.

Position adjustment of the middle detent 34a is done within the length of the adjusting screw shaft 38 so that, while the spring retainer 35 is moved according to the position adjustment of the middle detent 34a within this range, the biasing force of the spring 36 is not invalidated. That is, as far as the position of the middle detent 34a is adjusted in the range of the neutral position adjustment, the middle detent 34a can be maintained in an enclosed state by the both spring retainers 35 being forced by the springs 36.

In this configuration, in order to hold the movable swash plate 21c of the hydraulic pump 21 at neutral position, the neutral position holding mechanism 11a is composed of the detent rod 34, a pair of springs 36, and a pair of spring retainers 35. In this way, the neutral position holding mechanism 11a is composed in a simple and compact structure, thereby enabling the neutral position to be adjusted easily.

The detent rod 34 can be inserted and removed through the open end of the casing 33 in a cantilever state held by the cap 39. Therefore, it is only required to process a support recess 33b at the closed end of the casing 33 for inserting one end of the detent rod 34. Due to this, the wall thickness of the casing 33 can be reduced, so that the cost may be lowered.

Further, since the middle detent 34a and pin 41 are enclosed by the two spring retainers 35 biased in mutually opposite directions by the both springs 36 so as to hold the neutral position, a stop ring or other additional member is not required to receive the biasing force of the springs 36, and there is no trouble of dislocation of the stop ring or the like, so that the durability may be enhanced, and the precision holding the neutral position is also enhanced.

In the casing 33, moreover, there is a rotation control mechanism for controlling the maximum rotating angle of the movable swash plate. That is, the detent rod 34 includes a side detent 34d of a large diameter (or nearly same diameter as the middle detent 34a), through the small end 34b of a specific length, from the middle detent 34a toward each end, and a step 34d is formed between the small end 34b and side detent 34c, and each spring retainer 35 sliding toward each end of the detent rod 34 along the axial center direction of the detent rod 34 is configured to be finally stopped at each step 34d.

When the pin 41 is turned by rotation of the operation lever 20, the spring retainer 35 at the rotated pin 41 side slides together with the pin 41 toward the end side of the detent rod 34 against the biasing force of the spring 36. When the spring retainer 35 slides a certain amount, it abuts against the step 34d and is stopped, and the spring retainer 35 and pin 41 can no longer move to the end side of the detent rod 34. Thus, by the step 34d formed in the detent rod 34, the rotating amount of the pin 41 is limited, so that the maximum rotating angle of the movable swash plate 21c can be controlled.

Since the rotation control mechanism for controlling the maximum rotating angle of the movable swash plate is composed by forming a pair of side detents 34d in the detent rod 34 for composing the neutral position holding mechanism 11a, that is, by forming a pair of steps 34d, the maximum rotating angle from the neutral position of the movable swash plate 21c can be set correctly at high precision, and the durability of constituent members of the movable swash plate 21c and neutral position holding mechanism 11a is enhanced so that their high precision can be maintained for a long period.

The length between the middle detent 34a and each step 34d in the detent rod 34 corresponding to the stroke of the spring retainer 35, that is, the length of the small end 34b is determined in the mechanical machining process of the detent rod 34. After assembling the detent rod 34 in the casing 33, it is not necessary to adjust the rotation control mechanism and therefore, for example, the adjusting process before shipping can be omitted.

Figure 10:
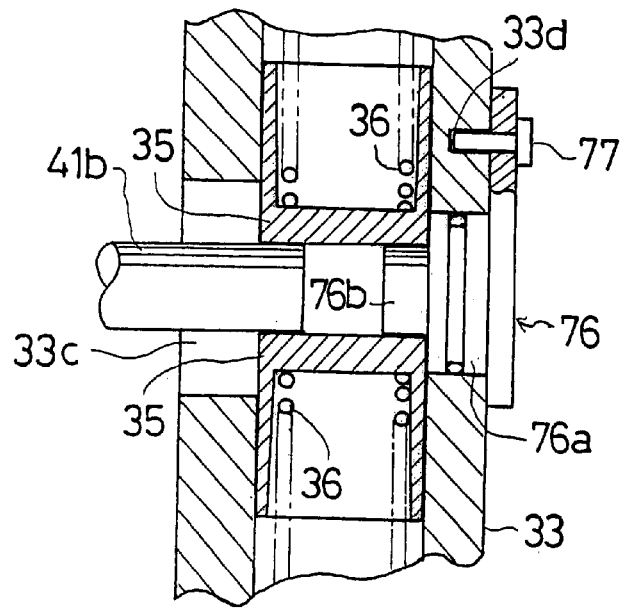
FIG. 10 is a fragmentary sectional front view of the casing 33 incorporating a modified example of the neutral position holding mechanism 11*a* employing a positioning member 76 capable of adjusting the position, instead of a detent rod 34.
Figure 11:
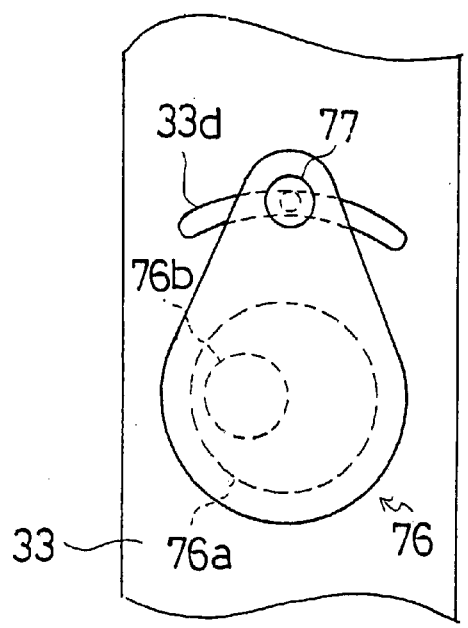
FIG. 11 is a fragmentary sectional side view of the same.

In another embodiment shown in FIG. 10 and FIG. 11, instead of the detent rod 34 provided with the middle detent 34a and adjusting screw shaft 38, as means for determining the neutral position of the pin 41, an adjusting arm 76 is disposed along the outer surface of casing 33 at the anti-housing 3 side, and a rotation fulcrum part 76a in a drum shape formed in the adjusting arm 76 is rotatably fitted into the casing 33, and an eccentric pin 76b projecting from a position eccentric from the axial center position of the rotation fulcrum part 76a is fitted into the cylinder chamber 33a. The eccentric pin 76b is a substitute for the middle detent 34a of the detent rod 34, and it is enclosed by the both spring retainers 35 forced by the springs 36, together with the second pin portion 41b of the pin 41.

In the casing 33, further, a slot 33d of an arc form concentric with the rotation fulcrum part 76a is formed, and a guide pin 77 projecting from the adjusting arm 76 is slidably fitted into the slot 33d. By moving the guide pin 77 within the slot 33d, the rotation fulcrum part 76a turns in the casing 33, and the eccentric pin 76b integral therewith moves in the cylinder chamber 33a, and the second pin portion 41b of the pin 41 is adjusted in position while being enclosed between the both spring retainers 35, together with the eccentric pin 76b.

In the configuration in FIG. 10 and FIG. 11, instead of the detent rod 34 having side detents 34c, move defining means of spring retainer 35, that is, other member as the rotation control mechanism may be incorporated in each spring chamber 37 of the casing 33, or part of the casing 33 may be processed to function similarly.

The torsion spring 40, the interlocking arm 27 and so on which are provided for operatively connecting the pin 41 to the operation lever 20 can compose a mechanism for holding the regulation of rotation of the pin 41 (revolution about the rotation fulcrum shaft 25) by the rotation control mechanism regardless of the over-stroke of the operation lever 20, in other words, for absorbing the over-stroke of the operation lever 20 manipulated over the rotation range of the pin 41.

As indicated by dotted line in FIG. 6, as mentioned above, the pin 41 is rotated integrally with the interlocking arm 27 and torsion spring 40 (that is, revolved about the rotation fulcrum shaft 25) by rotary manipulation of the operation lever 20, but when the pin 41 is limited in its rotation by the rotation control mechanism (each of the steps 34b) and no longer rotates, as indicated by double dot chain line in FIG. 6, the interlocking arm 27 rotating together with the operation lever 20 as being held by the torsion spring 40 rotates while widening the torsion spring 40 by resisting the biasing force. That is, after the rotation of the pin 41 is limited by the rotation control mechanism, only the interlocking arm 27 rotates while widening the torsion spring 40, so that the rotating operation force of the operation lever 20 may not be directly applied to the pin 41.

As a result, if the operation lever 20 is rotated and operated excessively, excessive force is not applied to the pin 41, spring retainers 35, and detent rod 34, thereby preventing breakage of these members and servo mechanism 61 or deviation of adjustment of the neutral position holding mechanism 11a.

As described herein, the neutral position holding mechanism 11a and rotation control mechanism, which are incorporated in the casing 33 attached to the housing 3 accommodating the HST 1, and the over-stroke absorbing mechanism disposed between the casing 33 and the housing 3 are substantially buried in the housing 3 of the HST 1, and the constituent members of these mechanisms are not contaminated with mud, dust or foreign matter, and occurrence of malfunction or deviation of adjustment due to impact from outside can be prevented, and each mechanism is compactly assembled in the HST 1, and the cost can be reduced.

Instead of the neutral position holding mechanism 11a comprising both the rotation control mechanism and over-stroke absorbing mechanism, a configuration of a neutral position holding mechanism 11b shown in FIG. 12 to FIG. 15, which also serve as another neutral position holding mechanism 11 comprising both the rotation control mechanism and over-stroke absorbing mechanism will now be explained by referring to FIG. 12 to FIG. 15.

Figure 12:
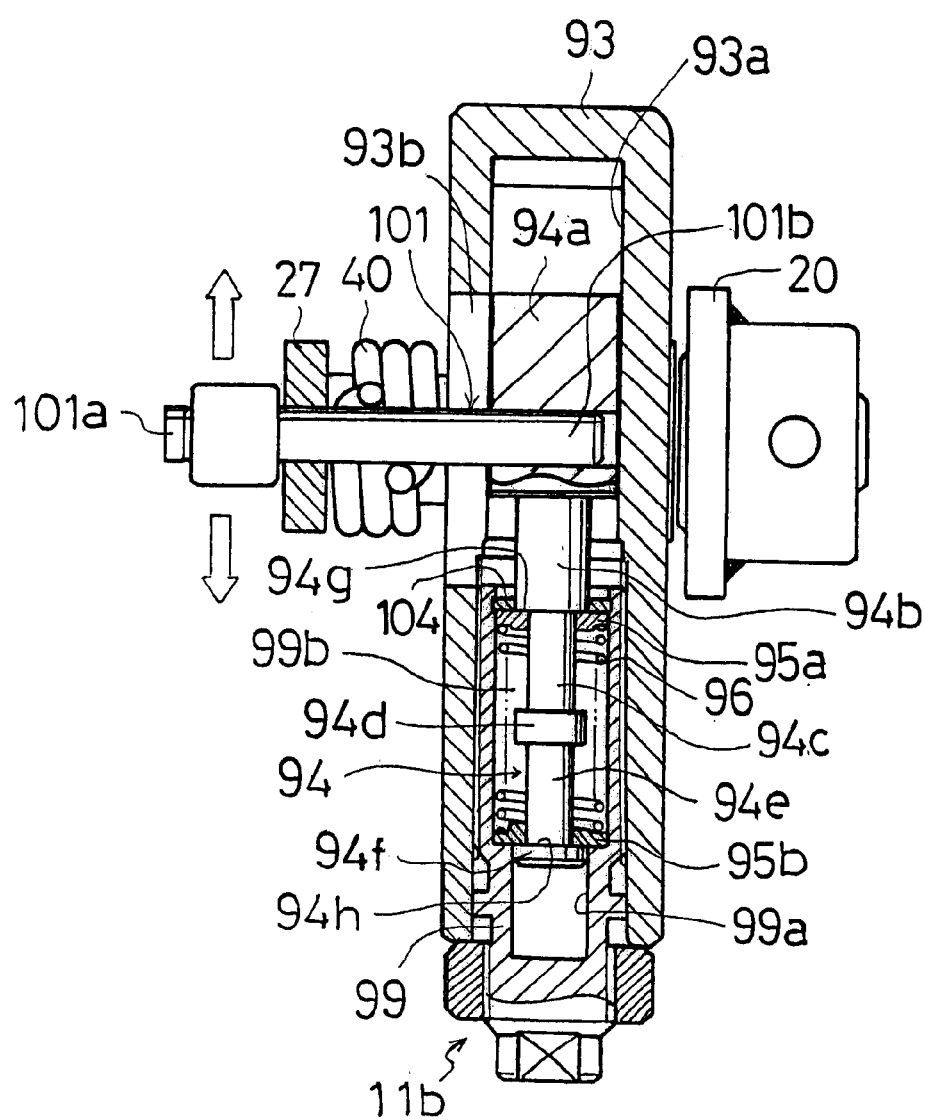
FIG. 12 is a sectional front view of a neutral position holding mechanism 11*b* incorporated in a casing 93 attached to the housing 3 of the HST 1, supporting the operation lever 21.

A detent rod 94 used in this neutral position holding mechanism 11b is composed as shown in FIG. 12, in which a pin fitting part 94a of a diameter nearly same as the inside diameter of a casing 93 described below is provided at one end, and a second detent 94f of a smaller diameter than the pin fitting part 94a is provided at other end, a first detent 94b of nearly same diameter as the second detent 94f is extended from the pin fitting part 94a to the second detent 94f, and a first small end 94c of a smaller diameter than the first and second detents 94b and 94f is extended from the first detent 94b to the second detent 94f. On the other hand, from the second detent 94f to the pin fitting part 94a, a second small end 94e of same diameter as the first small end 94e is extended, and a third detent 94d of a nearly same diameter as the first and second detents 94b and 94f is formed between the first small end 94c and second small end 94e.

The detent rod 94 is, as shown in FIG. 12, is disposed slidably in the axial center direction in a cartridge 99 continuously forming a spring chamber 99b and a support recess 99a inside. In an initial state shown in FIG. 12 (with a pin 101 described later replacing the pin 41 being in neutral position, without force applied on the detent rod 94 in the axial center direction), the second detent 94f is slidably inserted in the support recess 99a, and the first and second small ends 94c and 94e and third detent 94d are disposed in the spring chamber 99b, so that the first detent 94b and pin fitting part 94a are projecting from the cartridge 99.

In the spring chamber 99b, a first spring retainer 95a is slidably buried in the first small end 94c, and a second spring retainer 95b in the second small end 94e. The outer peripheral edge of a stop ring 104 is fixed in the inner circumference of the cartridge 99, and the first detent 94b is slidably inserted. Between the both spring retainers 95a and 95b, a spring 96 is interposed so as to bias and press the first spring retainer 95a against the end of the first detent 94b, that is, a first step 94g formed between the first detent 94b and first small end 94c, and the second spring retainer 95b against the end of the second detent 94f, that is, a second step 94h formed between the second detent 94f and second small end 94e.

When the detent rod 94 slides to the pin fitting part 94a side, the second spring retainer 95b resists the biasing force of the spring 96 while pressing against the end (second step 94h) of the second detent 94f, and slides to the pin fitting part 94a side together with the detent rod 94.

To the contrary, when the detent rod 94 slides to the second detent 94f side, the first spring retainer 95a resists the biasing force of the spring 96 while pressing against the end (first step 94g) of the first detent 94b, and slides to the second detent 94f side together with the detent rod 94.

In this manner, the cartridge 99 integrally incorporating the detent rod 94, stop ring 104, spring retainers 95a and 95b, and spring 96 is detachably provided in the casing 93 as shown in FIG. 12, and by slidably guiding the pin fitting part 94a on the inner circumference of the casing 93, the support strength of the detent rod 94 is increased, and the precision of holding the neutral position is enhanced.

Figure 13:
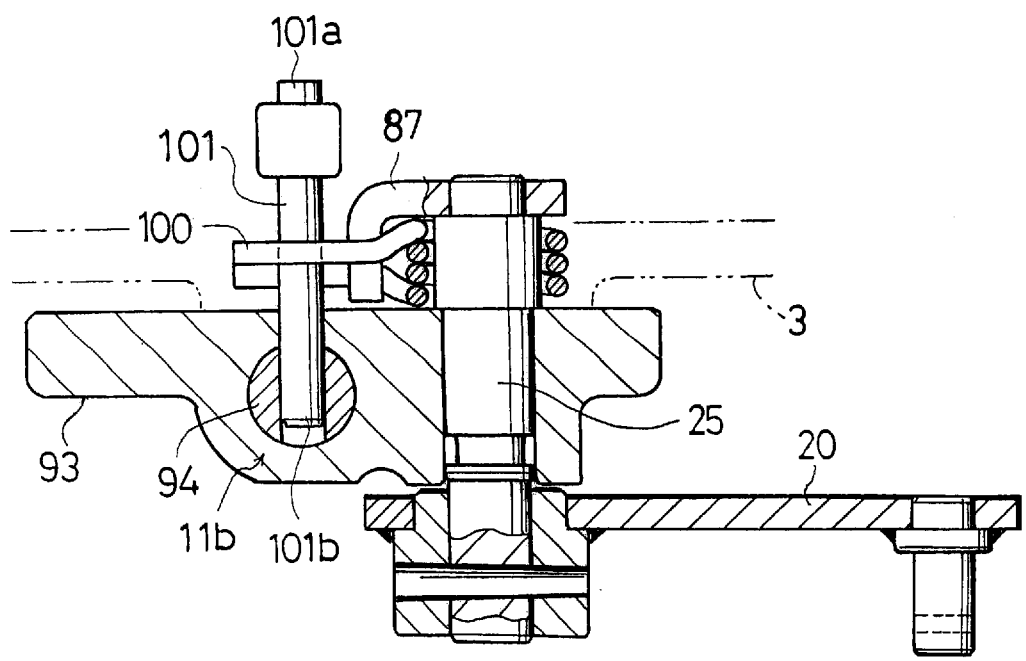
FIG. 13 is a sectional plan view of the neutral position holding mechanism 11*b* disposed in the casing 93, and an over-stroke absorbing mechanism disposed between the insides of the casing 93 and the housing 3 so as to be interposed between the operation lever 21 and a pin 101 serving as spool operating member.

Moreover, as shown in FIG. 13, a rotation fulcrum shaft 25 as fulcrum of rotation of operation lever 20 is rotatably provided in the casing 93. The base end of the operation lever 20 is fixed to one end of the rotation fulcrum shaft 25. The other end of the rotation fulcrum shaft 25 projects from the casing 93 on the opposite side and is fixed to an interlocking arm 87. That is, the interlocking arm 87 rotates integrally with the operation lever 20 by way of the rotation fulcrum shaft 25.

Further, a torsion spring 100 is wound around the rotation fulcrum shaft 25, and its both ends are bent so as to clamp the interlocking arm 87 and pin 101. Of the both ends of the pin 101, the second end 101b is fitted to the spool 72 of the hydraulic servo mechanism 6, and the first end 101a is fitted into the pin fitting part 94a in the casing 93 through a slot opening 93a of the casing 93 shown in FIG. 14 or FIG. 15.

In a state without force applied to the detent rod 94, the pin fitting part 94a of the detent rod 94 is held at a specific position by the biasing force of the spring 96, and in this state, hence, it is configured so that the movable swash plate 21c being interlocked and coupled may be held at the neutral position by way of the pin 101 inserted in the pin fitting part 94a, spool 72, or piston 71.

That is, by the detent rod 94, stop ring 104, spring retainers 95a and 95b, and spring 96 incorporated in the cartridge 99 provided in the casing 93, the neutral position holding mechanism 11b for holding the movable swash plate 21c at the neutral position is composed.

In the neutral position holding mechanism 11b having such configuration, when the operation lever 20 is rotated, the interlocking arm 87 fixed on the rotation fulcrum shaft 25 and the torsion spring 100 enclosing the interlocking arm 87 are rotated integrally.

Further, the pin 101 clamped by the torsion spring 100 is moved in the axial center direction of the detent rod 94 together with the detent rod 94, along with the rotary motion of the torsion spring 100. At this time, the slot opening 93a of the casing 93 guides the pin 101 by sliding.

When the detent rod 94 moves to the second detent 94f side by a specific amount, that is, by the length of the first small end 94c, the first spring retainer 95a moving together as being pressed by the end (the first step) of the first detent 94b is pressed to the third detent 94d of the detent rod 94, so that the detent rod 94 cannot move any longer. To the contrary, when the detent rod 94 moves to the pin fitting part 94 a side by the length of the second small end 94e, the second spring retainer 95b moving together as being pressed by the end (the second step) of the second detent 94f is pressed to the third detent 94d, so that the detent rod 94 cannot move any longer.

Thus, the third detent 94d of the detent rod 94 limits the moving distance of the detent rod 94 in the direction of axial center, that is, the moving amount of the pin 101, and hence it functions as the rotation control mechanism for controlling the maximum rotating angle of the movable swash plate 21c.

The precision of position of the third detent 94d formed on the detent rod 94 by machining is determined by the mechanical processing precision when machining the third detent 94c, and therefore after the detent rod 94 is assembled in the casing 94, adjustment of rotation control mechanism is not necessary, so that the adjustment process may be omitted, for example, before shipping.

When the operation lever 20 is rotated more than the moving extent of the pin 101 limited by the rotation control mechanism, the excessive rotation of the operation lever 20 is absorbed by the over-stroke absorbing mechanism composed of torsion spring 100 and others formed around the rotation fulcrum shaft 25 of the operation lever 20.

As described above, the pin 101 is moved as being held by the torsion spring 100 together with the interlocking arm 87 along with rotary operation of the operation lever 20. However, when the rotating angle of the operation lever 20 reaches a specific extent so that the rotation control mechanism prevents the pin 101 from further rotation, the interlocking arm 87 held by the torsion spring 100 and rotating integrally with the operation lever 20 resists the biasing force, and continues to rotate while widening the torsion spring 100 (for example, see the motion of the torsion spring 40, pin 41, and interlocking arm 27 in the neutral position holding mechanism 11a shown in FIG. 6). That is, after the rotation of the pin 101 is limited by the rotation control mechanism, only the interlocking arm 87 rotates while widening the torsion spring 100, so that the rotary operating force of the operation lever 20 may not be directly applied to the pin 101.

The neutral position holding mechanism 11b and the accompanying rotation control mechanism and over-stroke absorbing mechanism are substantially buried in the housing 3, same as in the case of the neutral position holding mechanism 11 and others mentioned above, by installing the casing 93 incorporating the cartridge 99 onto the housing 3 of the HST 1. Therefore, the constituent members of these mechanisms are not contaminated with mud, dust or foreign matter, and occurrence of malfunction or deviation of adjustment due to impact from outside can be prevented.

Figure 14:
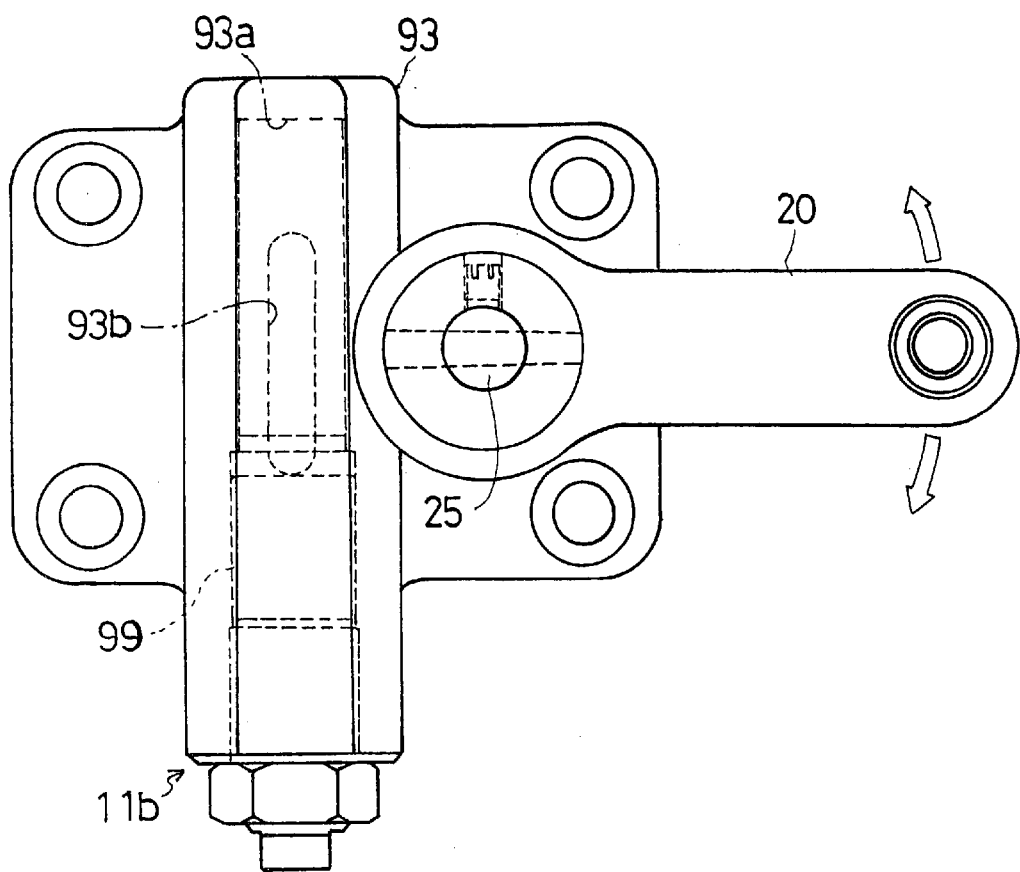
FIG. 14 is a side view of the casing 93 supporting the operation lever 21 and incorporating the neutral position holding mechanism 11*b*.
Figure 15:
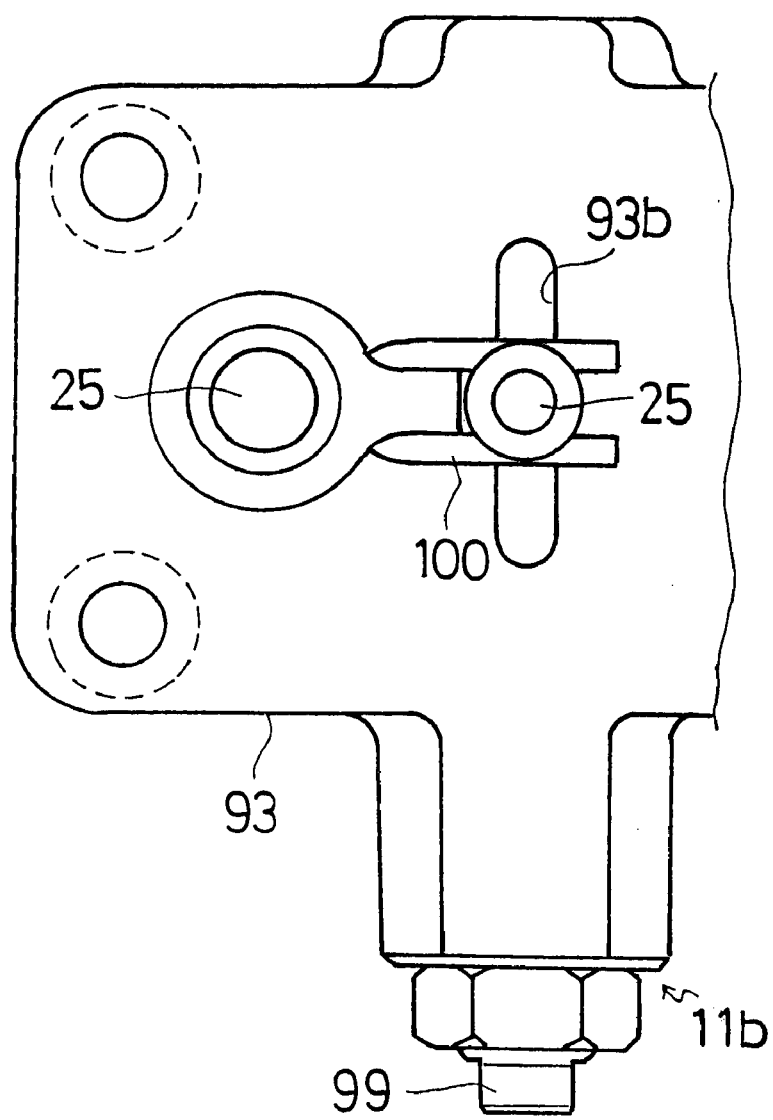
FIG. 15 is a side view of the same from its opposite side (housing 3 side).

Meanwhile, the neutral position holding mechanism 11b in this embodiment is incorporated in the cartridge 99 separately from the casing 93, and the cartridge 99 is detachably installed in the casing 93 mounted onto the housing 3 in a state as shown in FIG. 14, and therefore adjustment of neutral position and maintenance of the neutral position holding mechanism 11b will be easier. Moreover, the mechanism can be designed in a small size and the cost can be reduced.

The HST 1 explained herein is a combination of a variable displacement type hydraulic pump 21 and a fixed displacement type hydraulic motor 22, and as shown in FIG. 2 only one hydraulic servo mechanism 6 for controlling the movable swash plate 21c is buried in the housing 3 of the HST 1.

Figure 16:
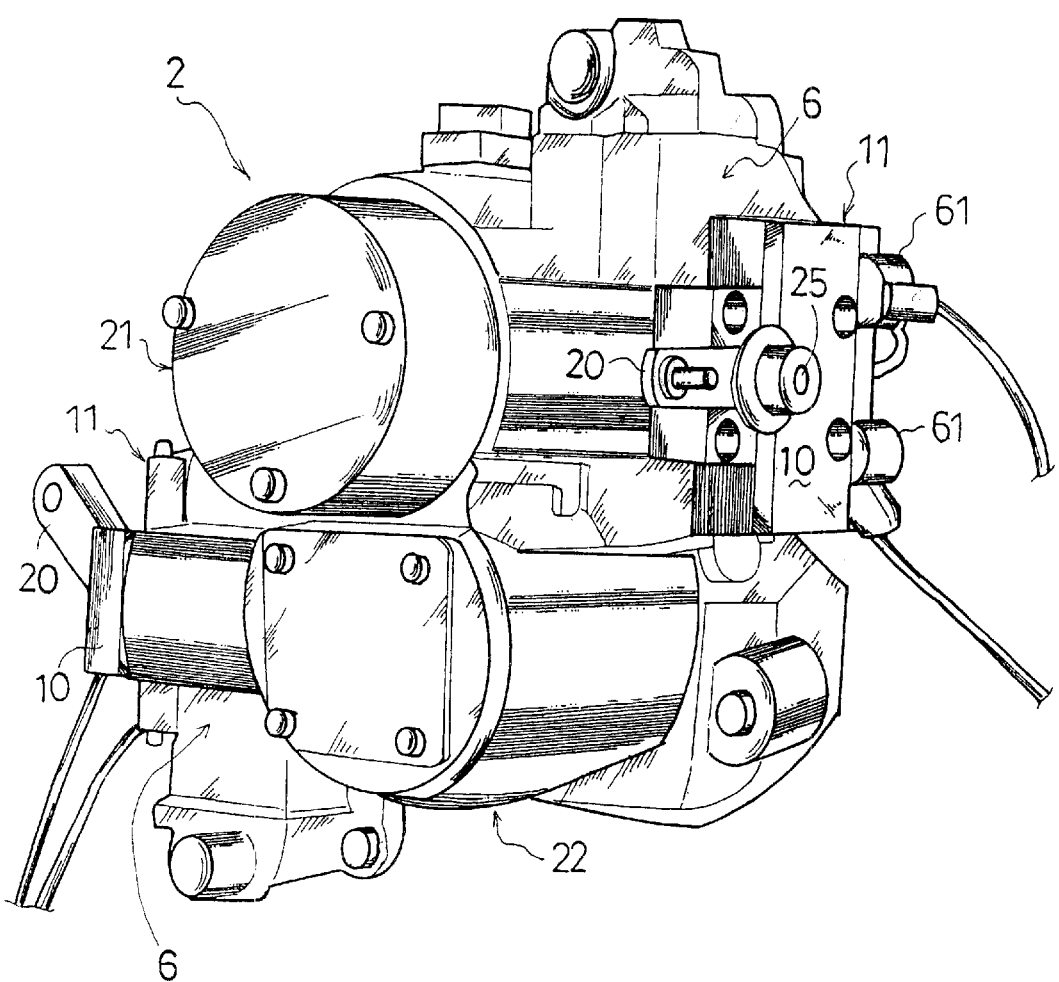
FIG. 16 is an overall perspective view of a hydraulic continuously variable transmission (HST 2) of which both hydraulic pump and motor are of a variable displacement type, wherein hydraulic servo mechanisms 6' are disposed for controlling the angles of the respective movable swash plates, and a solenoid proportional valve (automatic swash plate angle control valve) 61 for electronic control is attached to the casing 10 incorporating the neutral position holding mechanism 11.
Figure 17:
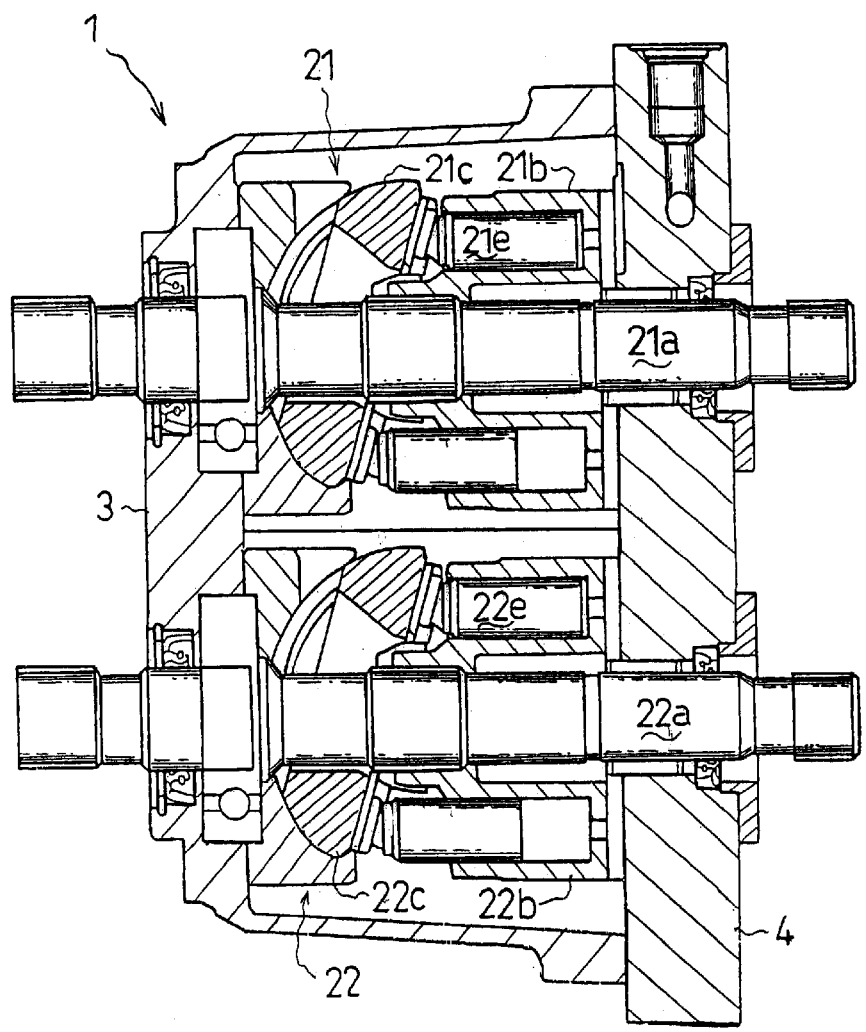
FIG. 17 is a sectional side view showing a hydraulic pump 21 and a hydraulic motor 22 of the HST 2.
Figure 18:
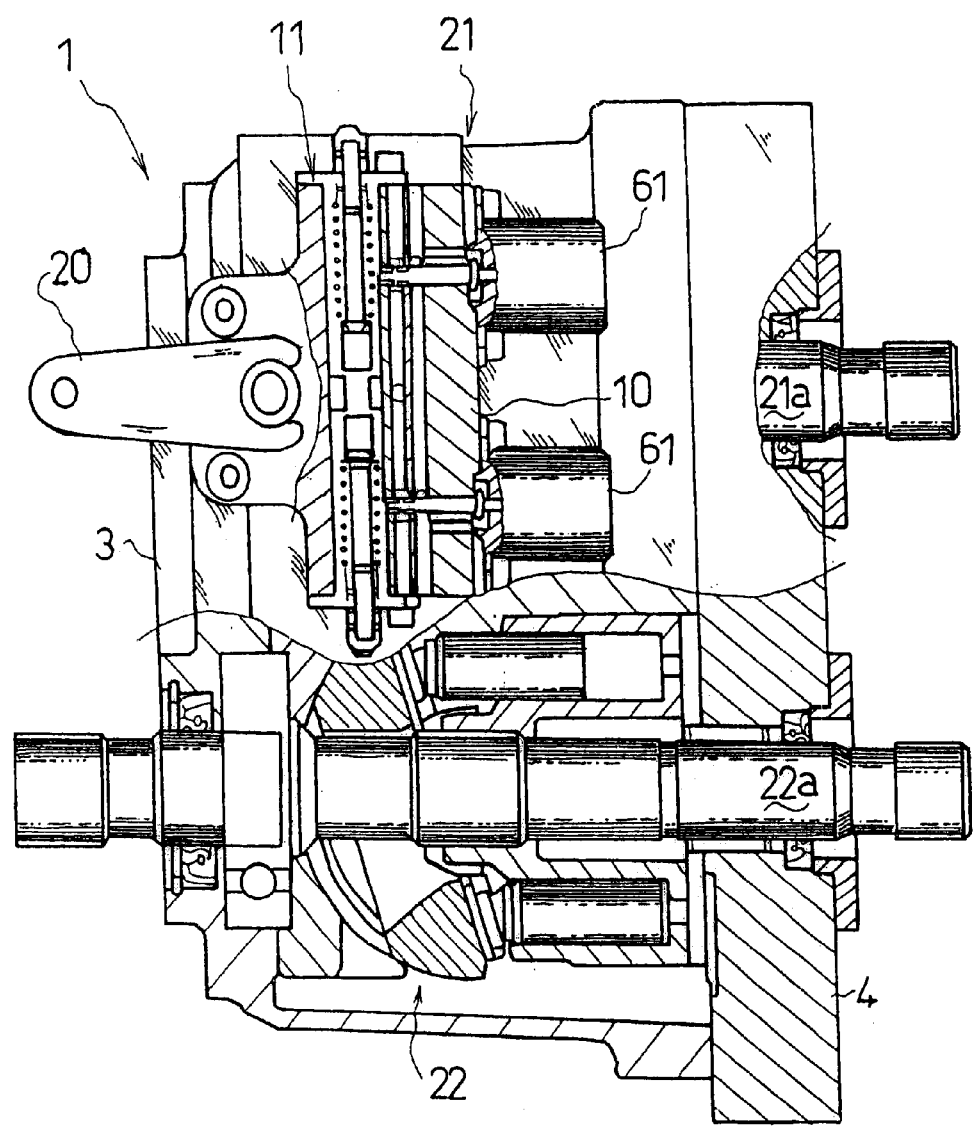
FIG. 18 is a side view of the HST 2 including a sectional side view of the hydraulic motor 22 and the neutral position holding mechanism 11*a* for swash plate angle control of hydraulic pump.

By contrast, in the HST 2 shown in FIG. 16 to FIG. 18, the hydraulic motor 22 is also of variable displacement type, and two hydraulic servo mechanisms 6 for controlling the position of the both movable swash plates 21c and 22c of the hydraulic pump 21 and hydraulic motor 22 are buried in the housing 3 (that is, one hydraulic servo mechanism for controlling the movable swash plate 21c at the side of the hydraulic pump 21, and one hydraulic servo mechanism 6 for controlling the movable swash plate 22c at the side of the hydraulic motor 22).

Further, in the HST 1 shown in FIG. 2, the automatic swash plate angle control valve 60 which is a solenoid proportional valve is designed to control the flow of the pressure fluid in the cylinder chamber 70 formed in the housing 3, and hydraulically controls the position of the piston 71 directly, thereby changing the position of the movable swash plate, and hence it is disposed above the forming area of the cylinder chamber 70 in the housing 3.

Figure 19:
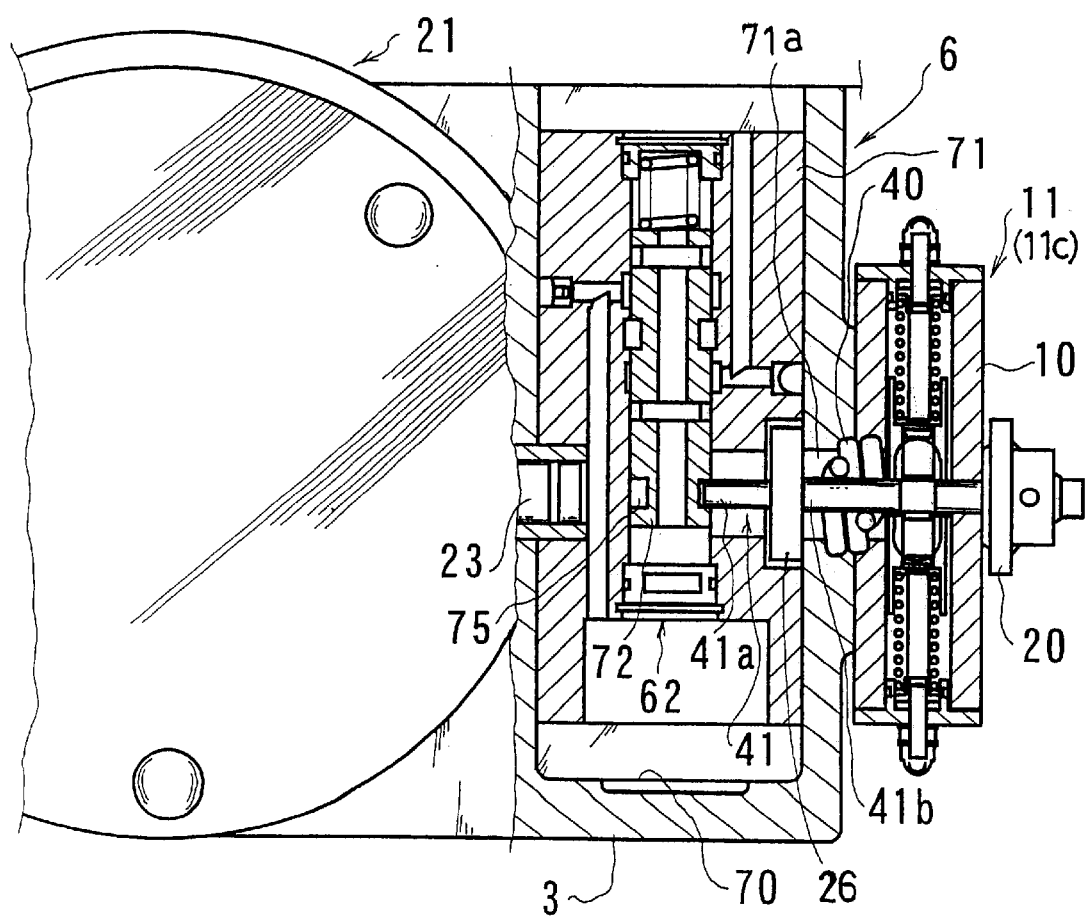
FIG. 19 is a fragmentary front view of the HST 2 including a sectional front view of the hydraulic servo mechanism 6*a* for swash plate angle control of hydraulic pump 21.

On the other hand, in the HST 2 shown in FIG. 17 or else, as shown in FIG. 18, FIG. 19 or else, an automatic swash plate angle control valve 61 is disposed before or after the casing 10 (replacing the casing 33 or 93) incorporating the neutral position holding mechanism 11 (in this embodiment, the neutral position holding mechanism 11c as described later) disposed outside of each hydraulic servo mechanism 6. The neutral position holding mechanism 11 (the neutral position holding mechanism 11c explained below and others) is operated to move the spool 72, thereby moving the piston 71 so as to move the movable swash plate 21c or 22c. In comparison with the automatic swash plate angle control valve 60 for the HST 1, which must be an exclusive one of a large capacity for controlling the oil pressure in the cylinder chamber 70 in order to move the piston 71, the automatic swash plate angle control valve 61 for HST 2 may be a commercial one of a small capacity because it controls only the oil pressure in the cylinder chamber 10c in the casing 10 of a smaller size.

The neutral position holding mechanism 11c shown in FIG. 18 to FIG. 23 is thus incorporated in the housing 10 provided thereon with the automatic swash plate angle control valve 61, and is controlled by the operation lever 21 and automatic swash plate angle control valve 61, and its configuration will now be explained.

As shown in FIG. 16 or else, a pair of nearly cylindrical automatic swash plate angle control valves 61 are fastened through plural respective bolts 63 to upper and lower parts at the rear end (upper and lower parts at the right end in FIG. 20) of the casing 10 (a casing larger part 10b explained below) incorporating the neutral position holding mechanism 11c. Other end of wiring 65 extended from each automatic swash plate angle control valve 61 is connected to a controller for controlling the solenoid proportional valve not shown.

Figure 20:
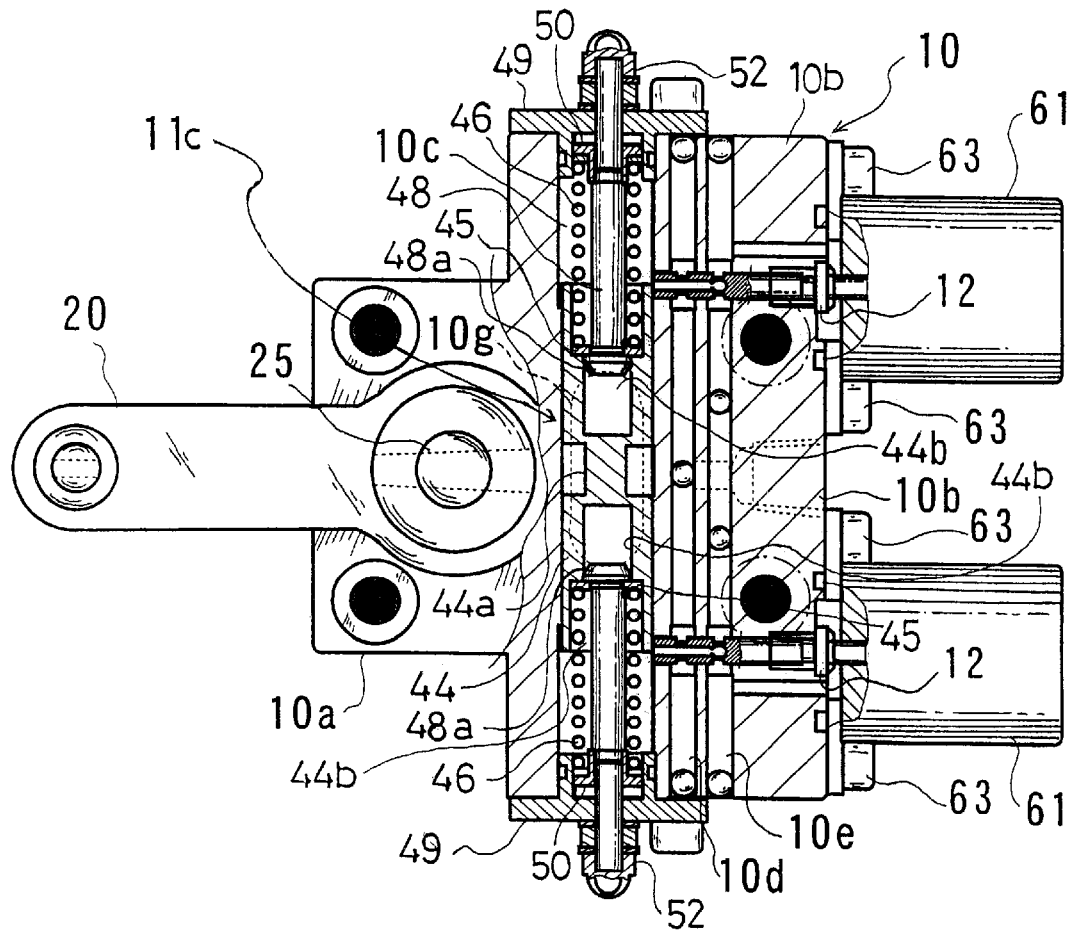
FIG. 20 is a sectional side view of each casing 10, which supports the operation lever 21, incorporates a neutral position holding mechanism 11*c*, and is provided thereon with the automatic swash plate angle control valve 61, for movable swash plate control of hydraulic pump 21 or hydraulic motor 22 in the HST 2.
Figure 21:
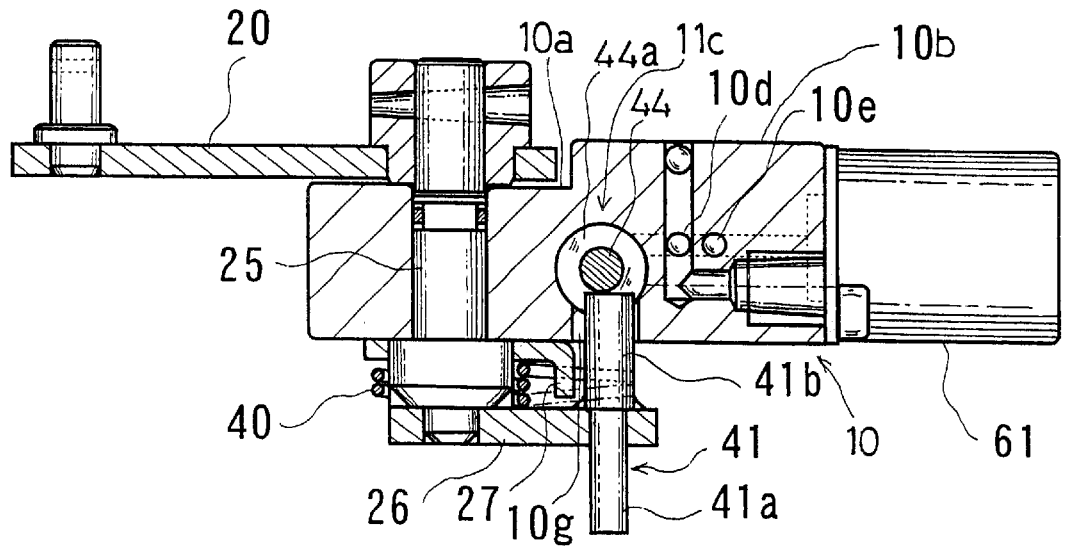
FIG. 21 is a sectional plan view of the same.

As shown in FIG. 20, FIG. 21 or else, the casing 10 is in a shape of extending a casing smaller part 10b of rectangular parallelepiped, one size smaller than the casing larger part 10b, forward (leftward in FIG. 20) from the middle of upper and lower parts of the front end (left end in FIG. 20) of the casing larger part 10b of rectangular parallelepiped. The rotation fulcrum shaft 25 of the operation lever 20 is supported by the casing smaller part 10a, and an over-stroke absorbing mechanism is formed around the rotation fulcrum shaft 25. A cylinder chamber 10c of vertical penetration type is formed in the casing larger part 10b, and constituent members of the neutral position holding mechanism 11c serving also as the rotation control mechanism is inserted in the cylinder chamber 10c.

In the casing larger part 10b, two oil passages of vertical penetration type are further pierced behind the cylinder chamber 10c (rightward in FIG. 20). These two oil passages are a pump port 10d in which pressure fluid is supplied from the charge pump and a tank port 10e for returning the oil to the drain, sequentially from the cylinder chamber 10c side.

From the axial center position of each automatic swash plate angle control valve 61 disposed at the rear end of the casing larger part 10b, a spool hole 10f is penetrating to the cylinder chamber 10c by way of the tank port 10e and pump port 10d. Both spool holes 10f communicate with both hydraulic chambers formed at both sides of the piston 44 described below in the cylinder chamber 10c, respectively.

In each spool hole 10f, a spool 12 of which forward and backward move is controlled electromagnetically is inserted.

The outer circumference of the spool 12 slidably contacts with the inner circumference of the spool hole 10f so as to block the spool hole 10f, thereby preventing the fluidal communication between the cylinder chamber 10c and pump port 10d, and between the pump port 10d and tank port 10e.

Figure 22:
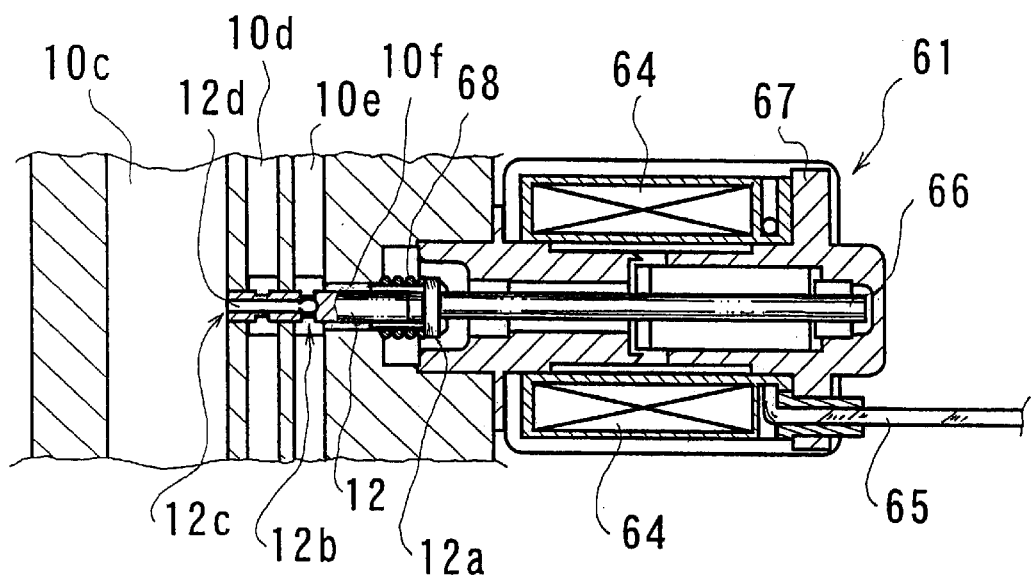
FIG. 22 is a sectional side view of a spool 12 of the automatic swash plate angle control valve 61 in non-excited mode.
Figure 23:
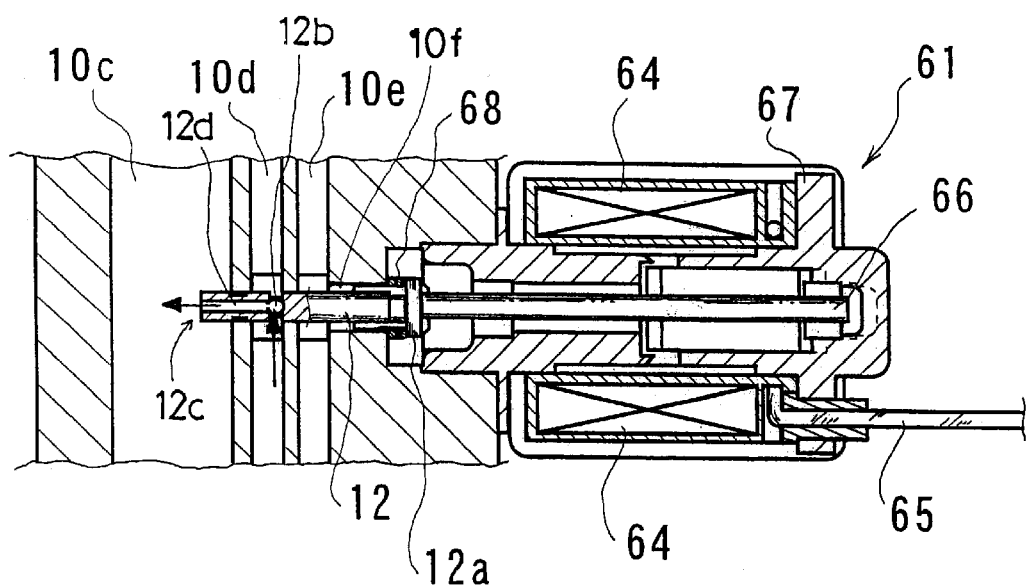
FIG. 23 is a sectional side view of the spool 12 of the automatic swash plate angle control valve 61 in excited mode.

However, each spool 12 is diametrically narrowed at the longitudinally intermediate portion thereof, in which a circular oil passage 12 is pierced. From the circular oil passage 12b to the leading end (tip) 12c of the spool 12, an oil passage 12d is formed in an axial core of the spool 12, and the open end of the axial core oil passage 12d always communicates with the cylinder chamber 10c. Therefore, when the spool 12 is disposed as shown in FIG. 22, the cylinder chamber 10c and pump port 10d communicate with each other by way of the oil passages 12b and 12d, or when the spool 12 is disposed as shown in FIG. 23, the cylinder chamber 10c and tank port 10e communicate with each other by way of the oil passages 12b and 12d.

A head 12a of each spool 12 abuts against the leading end of a movable iron core 66 mentioned below, projecting from each automatic swash plate angle control valve 61, behind the tank port 10e in the casing 10 (casing larger part 10b).

As shown in FIG. 20, in the casing smaller part 10a, a rotation fulcrum shaft 25 is rotatably supported in a direction orthogonal to the longitudinal direction of the cylinder chamber 10c. An outer end of the rotation fulcrum lever 25 projects outward from the casing smaller part 10a so as to be fixedly provided thereon with the base end of the operation lever 20. The other end of the rotation fulcrum shaft 25 projects from the casing smaller part 10a into the housing 3 so as to be fixedly provided thereon with the interlocking arm 27, and therearound with the torsion spring 40. Further the base end of the support arm 27 is freely fitted to the other end of the rotation fulcrum shaft 25. A pin 41, serving as a spool operating member for driving a spool 72 as manual swash plate angle control valve 62, is fixed on the support arm 27 near the leading end thereof, in parallel to the rotation fulcrum shaft 25. A first pin portion 41a of the pin 41 is fitted to the spool 72 in the housing 3. Both ends of the torsion spring 40 are bent so as to clamp the support arm 27 and second pin portion 41b of the pin 41.

This configuration is similar to the one disposed next to the neutral position holding mechanism 11a. By rotation of the torsion spring 40 and interlocking arm 27 integrally with the rotation fulcrum shaft 25 according to rotary operation of the operation lever 20, the pin 41 revolves about the rotation fulcrum shaft 25 to move the spool 27, thereby hydraulically controlling the hydraulic piston 71 so as to rotate the movable swash plate 21c or 22c. Further, the torsion spring 40 and interlocking arm 27 constitute an over-stroke absorbing mechanism for absorbing an over-stroke when the operation lever 20 is manipulated over the move defining position of the pin 41.

In the casing 10, from around the middle of the cylinder chamber 10c thereof to the outer side thereof at the disposing side of the interlocking arm 27, a communication slot 10g is formed. The second pin portion 41b of the pin 41 is inserted into the cylinder chamber 10c through the communication slot log. The communication slot 10g is formed so as to orient the longitudinal direction thereof along the longitudinal direction of the cylinder chamber 10c, so that, when the operation lever 20 is turned, the pin 41 is rotated integrally with the operation lever 20 through the interlocking arm 27 and torsion spring 40 so as to move the spool 72.

The neutral position holding mechanism 11c composed in the cylinder chamber 10c of the casing larger part 10b will now be explained.

As shown in FIG. 20 and FIG. 21, a piston 44 is slidably inserted in the cylinder chamber 10c in its longitudinal direction (vertical direction in FIG. 20). The piston 44 is formed around the substantially middle portion thereof with an annular groove 44a of a width nearly same as the diameter of the second pin portion 41b of the pin 41 inserted in the cylinder chamber 10c, and the leading end of the second pin portion 41b is inserted in the annular groove 44a.

At each of both sides of the annular groove 44a of the piston 44 (each of parts of the piston 44 above and beneath the annular groove 44a in FIG. 20), a bolt guide recess 44b and a spring chamber 44c are formed continuously, and the spring chamber 44c is opened toward each open end of the cylinder chamber 10c.

In FIG. 20, a cap 49 is applied at each end of the casing 10 in order to plug the both open ends of the cylinder chamber 10c at both ends (upper and lower sides) of the casing 10.

In each spring chamber 44c of the piston 44, a spring retainer 45 is disposed, and a spring 46 is interposed in compressed state between each spring retainer 45 and each fixed spring retainer 50 fixed around a later-discussed adjusting bolt 48 near each cap 49. Accordingly, each spring retainer 45 is forced toward the annular groove 44a positioned between the both spring retainers 45, and in an initial state, that is, when operating force is not applied to the operation lever 20, it is pressed against the end face of each spring chamber 44c, that is, the step between the spring chamber 44c and bolt guide recess 44b. Thus, since the annular groove 44a enclosing the pin 41 is fixed in position by the biasing force from both sides of the both springs 45, the movable swash plate 21c or 22c is held at the neutral position.

When the operation lever 20 is rotated, as mentioned above, the pin 41 revolves about the rotation fulcrum shaft 25 in a state being enclosed by the torsion spring 40, and by this motion, further, the piston 44 is moved along the longitudinal direction of the cylinder chamber 10c by resisting the biasing force of the both springs 46. When the operating force of the operation lever 20 is released, the piston 44 fitting to the pin 41 returns to the initial position again by the biasing force of the both springs 46, thereby returning the movable swash plate 21c or 22c to the neutral position.

In this way, when moving the pin 41 by manipulation of the operation lever 20, the biasing force of the spring 46 is utilized. However, in the cylinder chamber 10c, pressure fluid is supplied to both sides of the piston 44, and the piston 44 is, as described below, a double action hydraulic pump operated by two automatic swash plate angle control valves 61. Therefore, in operation of the piston 44 by the operation lever 20, the oil pressure resistance in this hydraulic chamber should not impede its action.

When manipulating the operation lever 20, as shown in FIG. 20, the solenoid of the both automatic swash plate angle control valves 61 is in non-excited state, that is, the solenoid thrust is zero, so that the both spools 12 are held at the position shown in FIG. 22 by the biasing force of the spring 68 so as to put the tank port 10e into communication with each hydraulic chamber in the cylinder chamber 10a. Thus, for example, when moving the piston 44 upward in FIG. 20, an excess pressure fluid is released from the upper side hydraulic chamber to the tank port 10e, while the lower side hydraulic chamber falls in negative pressure, so that the spool 12 temporarily projects as shown in FIG. 23, and pressure fluid is supplemented from the pump port 10e, whereby the both hydraulic chambers are finally held at nearly same pressure as in the tank port 10e, thereby allowing the piston 44 to move freely.

In the cylinder chamber 10c incorporating the neutral position holding mechanism 11c, if the position of the annular groove 44a fixed in position by the biasing force of the both springs 46 is deviated from the position of the pin 41 suitable to correspond to the neutral position of the movable swash plate 21c or 22c, a pair of adjusting bolts 48 are disposed in the cylinder chamber 10c so as to match the position of the annular groove 44a accurately with the position of the pin 41, in the longitudinal direction of the cylinder chamber 10c across the piston 44 (in the upper and lower side of the piston 44 in FIG. 20).

Each adjusting bolt 48 passes through each spring chamber 44c of the piston 44, and slidably penetrates through the spring retainer 45, and its inner end (bolt head) 48a is slidably inserted in each bolt guide recess 44b.

The outer end of each adjusting bolt 48 penetrates and projects outward as being engaged with female threads formed in each cap 49, and a lock nut 52 is applied on the threads formed on the projecting portion of the adjusting bolt 48. Usually, the lock nut 52 is tightened to the surface of the cap 49, and the adjusting bolt 48 is fixed in position. If the position of the pin 41 corresponding to the neutral position of the movable swash plate 21c or 22c and the initial position of the annular groove 44a held by the biasing force of both springs 46 are deviated from each other, the lock nut 52 is loosened, and the both adjusting bolts 48 are turned to move in the direction of axial center, thereby moving the piston 44 so as to adjust the position of the annular groove 44a.

As an example of practical operation, in FIG. 20, suppose the pin 41 is moved upward. In this case, first of all, the upper side lock nut 52 is loosened and the upper side adjusting bolt 48 is moved upward, whereby the bolt head 48a pushes up the upper side spring retainer 48 by resisting the biasing force of the upper side spring 46.

After moving properly, the lower side lock nut 52 is loosened and the lower side adjusting bolt 48 is moved upward. Then, since the piston 44 is free from the downward biasing force by the upper side spring 46 because the upper side spring retainer 45 is moved upward, the lower side spring retainer 45 is moved upward integrally with the lower side adjusting bolt 48 by the upward biasing force of the lower side spring 46 while keeping contact with the step between the lower side spring chamber 44c and lower side bolt guide recess 44b beneath the piston 44. By this movement, the pin 41 engaged with the annular groove 44a is moved upward to be matched with the correct position corresponding to the neutral position of the movable swash plate 21c or 22c, and then, the lower side lock nut 52 is loosened and the lower side adjusting bolt 48 is fixed.

Consequently, when the upper side adjusting bolt 48 once moved upward to a proper position is moved downward, the upper side spring retainer 45 is moved downward by the biasing force of the upper side spring 46 while keeping contact with the bolt head 48a of the upper side adjusting bolt 48. When this spring retainer 45 finally hits against the step between the upper side spring chamber 44c and upper side bolt guide recess 44b above the piston 44, that is, when the bolt heads 48a of the both adjusting bolts 48 are in the same interval as the both bolt heads 48a before adjustment of position of the annular groove 44a, the upper side lock nut 52 is tightened and the upper side adjusting bolt 48 is fixed, thereby terminating the position adjustment procedure of the pin 41.

If desired to move the pin 41 lower than the position of the annular groove 44a held by the biasing force of the both springs 46, the position of the annular groove 44a can be adjusted by inverting the operation about the upper and lower side adjusting bolts 48 and others.

The both adjusting bolts 48 function not only as adjusting means for setting the neutral position of the piston 44, but also as rotation control mechanism, that is, a mechanism for determining the maximum rotating angle of the movable swash plate 21c or 22c. That is, in the piston 44, two bolt guide recesses 44b are formed at both sides of the annular groove 44a, and their length is set as the relative sliding range of each adjusting bolt 48 in relation to the piston 44. For example, in FIG. 20, the piston 44 is allowed to move upward until the bolt head 48a of the upper side adjusting bolt 48 being fixed in position abuts against the deepest end (lower end) of the upper side bolt guide recess 44b. When moving the piston 44 downward, its moving limit position is when the bolt head 48a of the lower side adjusting bolt 48 abuts against the deepest end (upper end) of the lower side bolt guide recess 44b.

If the operation lever 20 is manipulated over such moving limit range of the piston 44, same as mentioned above, the over-stroke is absorbed by the over-stroke absorbing mechanism composed of the torsion spring 40 and interlocking arm 27.

FIG. 22 and FIG. 23 explain the control mechanism for controlling the swash plate angle of the movable swash plates 21c and 22c through the pin 41, spool 72, and piston 71, by sliding up and down the piston 44 of the neutral position holding mechanism 11c by the automatic swash plate angle control valve 61 composed of solenoid proportional valve.

The automatic swash plate angle control valve 61 is composed of a coil 64, a movable iron core 66 capable of sliding in the direction of axial center, and a fixed iron core 67 for increasing the magnetic force of the coil 64, and a powerful solenoid controlled by on/off switching of electric signal is composed.

The spool head 12a of the spool 12 is forced to the solenoid side by the spring 68. When an electric current flows in the coil 64, the solenoid thrust Fsol (that is, the thrust applied to the movable iron core 66) is determined in proportion to the current value. To counteract this solenoid thrust Fsol, the force generated in the spool 12 by the oil pressure in each hydraulic chamber at each side of the piston 44 in the cylinder chamber 10, that is, the spool thrust Fs as the product of the oil pressure P and the sectional area S (constant) of the leading end 12c of the spool 12 works. Therefore, the spool 12 actually oscillates between the position shown in FIG. 22 and the position shown in FIG. 23, and finally converges at the balancing position of the solenoid thrust Fsol and spool thrust Fs. Incidentally, the spring 68 is intended to hold the spool 12 in the initial position as mentioned above when the solenoid is not excited or to correct the coil characteristic, and may be ignored in the relation between the solenoid thrust Fsol and spool thrust Fs.

When the current value is increased, the solenoid thrust Fsol is increased proportionally, and it tends to raise the oil pressure P in order to heighten the spool thrust Fs to counteract. Therefore, the spool 12 moves to the cylinder chamber 10c side while oscillating so as to bring the pump port 10d into communication with each hydraulic chamber of the cylinder chamber 10c as shown in FIG. 23, thereby elevating the oil pressure P so as to balance the spool thrust Fs and the solenoid thrust Fsol. The rise of the oil pressure P is proportional to the increment of the solenoid thrust Fsol, and the piston 44 is operated by this oil pressure rise. That is, the piston 44 is moved in proportion to the current value flowing in the solenoid of the solenoid proportional valve of the automatic swash plate angle control valve 61.

Thus, for moving the piston 44 by electronic control, an electric current is passed in the coil 64 of one solenoid only of the both automatic swash plate angle control valves 61 provided to the respective hydraulic servo mechanisms 6, and the current value is 0 in the other. When moving the piston 44, the spool 12 of the automatic swash plate angle control valve 61 of current value of 0 is held at the initial position shown in FIG. 22 because of the compression of the hydraulic chamber through which this spool 12 passes aside from the biasing force of the spring 68, and the increment due to contraction is returned to the tank port 10e. Thus, for example, when desired to move the piston 44 downward, an electric current is applied only to the solenoid of the upper valve 61 of the upper and lower automatic swash plate angle control valves 61, and the current value is 0 in the lower valve 61, so that the piston 44 moves downward depending on the current value in the upper valve 61.

In this way, by passing an electric current selectively in either one of the both automatic swash plate angle control valves 61, the piston 44 can be moved either up or down by sliding, and by the sliding motion of the piston 44, the pin 41 fitted to the piston 44 slides along the communication hole 10g of the casing 10, thereby moving the spool 72, so that the swash plate angle of either the movable swash plate 21c of the hydraulic pump 21 or the movable swash plate 22c of the hydraulic motor 22 can be controlled automatically.

The automatic swash plate angle control valve 61 is designed to control the swash plate angle of the movable swash plates 21c, 22c in an optimum state, by means that the current passing timing and current value in the coil 64 thereof is controlled by feeding back the engine load, wheel load, and others detected by sensor and other detecting means to the controller for the solenoid proportional valves.

In this embodiment, the automatic swash plate angle control valve 61 is not the automatic swash plate angle control valve 60 as shown in FIG. 1, that is, not the type of enabling pressure fluid control of a large capacity so as to control the position of the piston 71 directly, but it is enough to control hydraulically the position of the piston 44 of the compact neutral position holding mechanism 11c, and a commercial solenoid proportional valve may be used. Further, although the same in FIG. 1 is provided above the housing 3, it is disposed before or after the casing 10 incorporating the neutral position holding mechanism 11c in this embodiment. Thus, this automatic swash plate angle control valve 61 as a device is compact and not expensive. Therefore, the HST 2 as shown in FIG. 16 comprising such automatic swash plate angle control valve 61 as in this embodiment, while both the hydraulic pump 21 and hydraulic motor 22 thereof are of the variable displacement type so as to require automatic control of their movable swash plates, is low in cost and compact in design.

Figure 24:
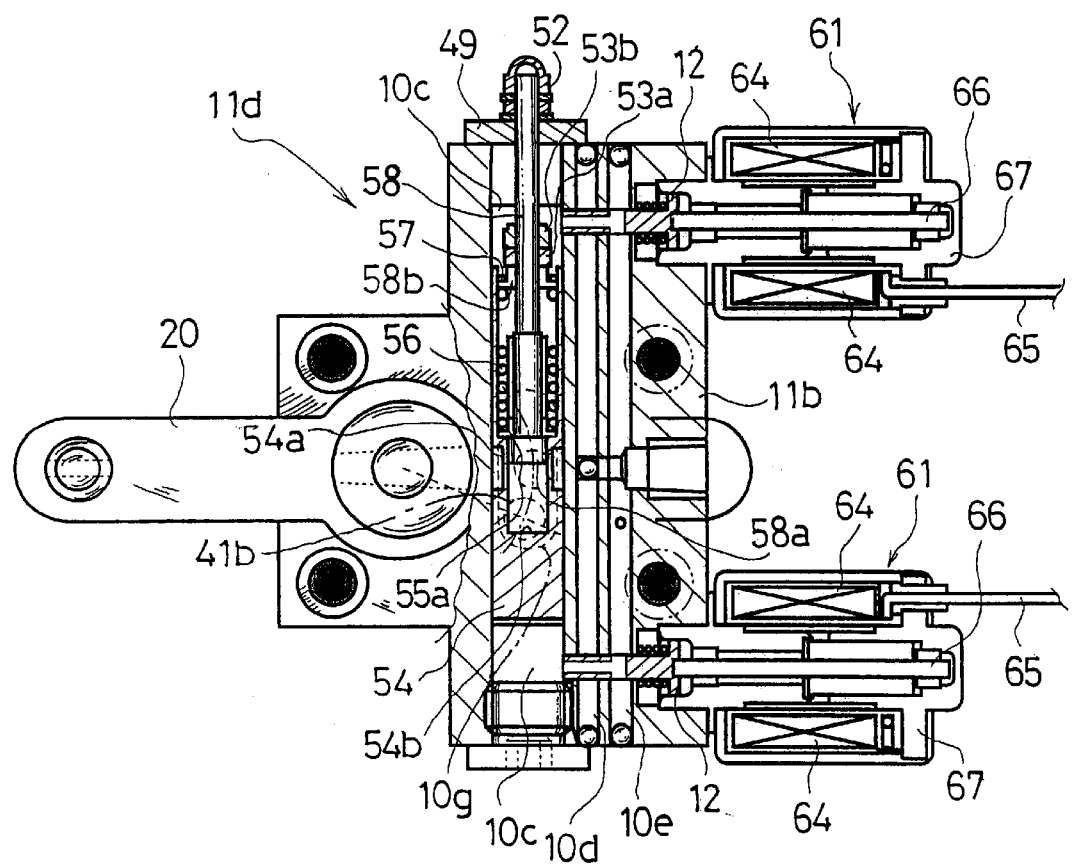
FIG. 24 is a sectional side view of each casing 10 supporting the operation lever 21, incorporating a neutral position holding mechanism 11*d*, and provided thereon with the automatic swash plate angle control valve 61.
Figure 25:
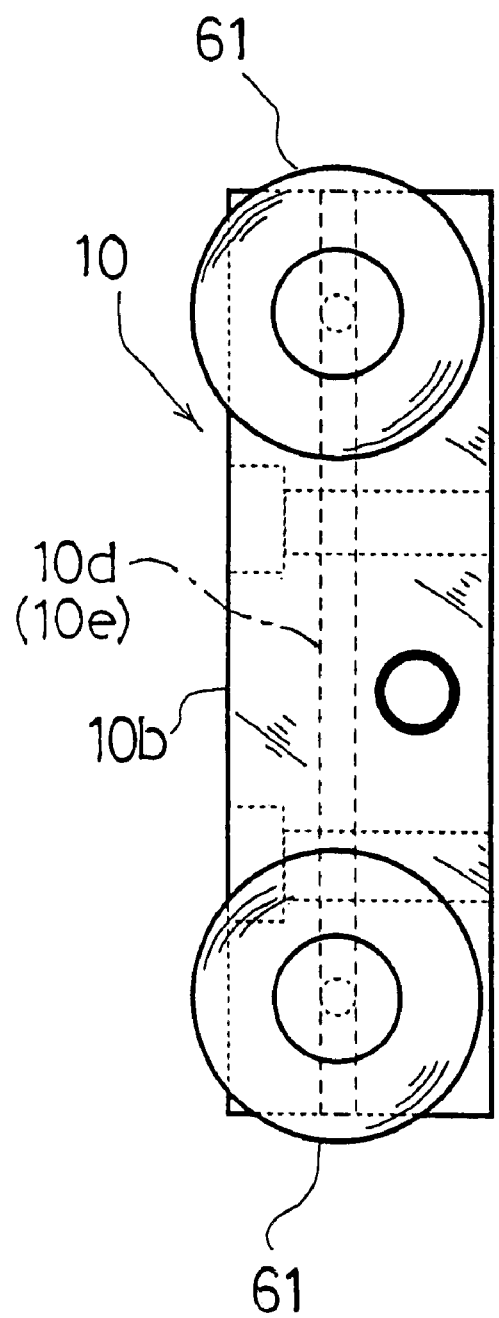
FIG. 25 is a rear view of the same.

FIG. 24 and FIG. 25 refer to another embodiment wherein a neutral position holding mechanism 11d of another structure is disposed in the housing 10, to which the automatic swash plate angle control valve 61 is attached similarly with that in FIG. 20 to FIG. 23.

The structure of the casing 10 is substantially same as shown in FIG. 20 and FIG. 21, in which the casing smaller part 10a supporting the rotation fulcrum shaft 25 of the operation lever 20, and the casing larger part 10b incorporating the neutral position holding mechanism 11d and provided thereon with two upper and lower solenoid valves serving as the automatic swash plate angle control valves 61 are coupled together. The oil passage structures comprising the cylinder chamber 10c, pump port 10d, tank port 10e, and spool hole 10f in the casing larger part 10b are also similar. Meanwhile, the rear view of FIG. 25 may be used as the rear view of the housing 10 in FIG. 20 by replacing the asymmetric configuration of bolt holes 10i for mounting the casing 10 on the housing 3 with the vertically symmetric configuration.

The both open ends of the cylinder chamber 10c are plugged with the caps 49 of the same structure as mentioned above.

In the cylinder chamber 10c, a piston 54 is slidably disposed. In this piston 54, along its axial center, a bolt guide recess 54b, and a spring chamber 54c of a larger diameter than the bolt guide recess 53b are formed continuously. The spring chamber 54c is opened to the cylinder chamber 10c. On the way of the longitudinal direction of the bolt guide recess 54b, an annular groove 54a is formed around the piston 54. It corresponds to the annular groove 44a mentioned above, and the leading end of the second pin portion 41b of the pin 41 is fitted into the annular groove 54a.

Thus, the piston 54 is open at one end only as the spring chamber 54c. A single adjusting bolt 58 passes from the bolt guide recess 54b through the spring chamber 54c, while slidably disposing a bolt head 58a thereof in the bolt guide recess 54b, so that the leading end of the adjusting bolt 58 is screwed through one cap 49, projects outside, and is tightened by the lock nut 52 same as in the case of the neutral position holding mechanism 11c.

In the spring chamber 54, a medium diameter part 58b of the adjusting bolt 58, which is diametrically smaller than the bolt head 58a, is slidably passed through the first spring retainer 55a formed in a tubular form. Further, the adjusting bolt 58 is formed with a small diameter end 58c of smaller diameter than the medium diameter part 58b, outward from the medium diameter part 58b up to the leading end thereof where the lock nut 52 is applied. The small diameter end 58b slidably penetrates through the second spring retainer 55b in the spring chamber 54c. A stop ring 57 fixed to the inner circumference of the piston 54 near the open end of the spring chamber 54 is a stopper of the second spring retainer 55. The spring 56 in compressed state in the spring chamber 54c is interposed between the first spring retainer 55a and second spring retainer 55b. By the biasing force of this spring 56, in the initial state as shown in FIG. 24, the first spring retainer 55a is pressed against the end of the spring chamber 54c, that is, the step between the spring chamber 54c and the bolt guide recess 54b, and the second spring retainer 55b is pressed against the stop ring 57.

Adjacently to the second spring retainer 55b in a state pressed against the stop ring 57, outside of the spring chamber 54c, a stopper nut 53a is slidably provided around the small diameter end 58c of the adjusting bolt 58, and an adjusting nut 53b is screwed therearound adjacently to the stopper nut 53a. When the piston 54 moves to the disposing position side of the lock nut 52, they function as a stopper of the second spring retainer 55b.

In the foregoing neutral position holding mechanism 11c, the annular groove 44a of the piston 44 (for enclosing the second pin portion 41b of the pin 41) is held at the balanced position by receiving biasing force from both side by the two springs 46, whereas in the neutral position holding mechanism 11d of the embodiment, the piston 54 is held in the balanced state of the first spring retainer 55a and second spring retainer 55b by the biasing force of one spring 56 disposed at one side of the annular groove 54a so as to hold the position of the pin 41 for being enclosed by the annular groove 54a.

In thus balanced state, if the position of the annular groove 54a is deviated from the position of the pin 41 accurately corresponding to the neutral position of the movable swash plate 21c or 22c, the lock nut 52 is loosened, and the adjusting bolt 58 is rotated and moved in the direction of its axial center, so that the position of the annular groove 54a can be adjusted.

When desired to move the annular groove 54a downward in FIG. 24, the adjusting bolt 58, while the lock nut 52 therearound being loosened, is moved to the bolt head 58a side so that the piston 54 is also moved together with the motion of the adjusting bolt 58 by the biasing force of the spring 56.

To the contrary, when desired to move the annular groove 54a upward in FIG. 24, the adjusting bolt 58, while the lock nut 52 therearound being loosened, is moved to the opposite side of the bolt head 58a. At this time, the stopper nut 53a and adjusting nut 53b also move together with the adjusting bolt 58, and the bolt head 58a pushes the first spring retainer 55a upward. Therefore, by the biasing force of the spring 56, the second spring retainer 55b also moves upward while being pressed against the stop ring 57, thereby abutting against the lock nut 53a. In this way, since the stop ring 57 is pushed upward by the second spring retainer 55b, the piston 54 together with the stop ring 57 follows up the motion of the adjusting bolt 58 so as to move upward in FIG. 24. Finally, by tightening the lock nut 52 at a proper position, positioning of the annular groove 54a is complete.

The neutral position holding mechanism 11d having such configuration has a double action piston, and comprises two solenoid proportional valves serving as automatic swash plate angle control valves 61 for feeding pressure fluid to both hydraulic chambers enclosing the piston in the cylinder chamber. In this respect, it is similar to the foregoing neutral position holding mechanism 11c. However, it uses only one adjusting bolt and one spring so as to curtail the number of parts. Moreover, in the case of the neutral position holding mechanism 11c, two adjusting bolts 48 must be turned in order to adjust the position of the annular groove 44a correctly at the neutral position of the pin 41, but all the requirement is only to turn one adjusting bolt 58 only in the case of the neutral position holding mechanism 11d of the embodiment.

When moving the piston 54 upward in FIG. 24 by turning the operation lever 20, the second spring retainer 55b is held at the initial position because the adjusting bolt 58, stopper nut 53a, and adjusting nut 53b are fixed in position, and the first spring retainer 55a is pushed by the step between the bolt guide recess 54b and spring chamber 54c of the piston 54 so as to move rightward together with the piston 54 by overcoming the spring 56. The first spring retainer 55a, which is tubular as mentioned above, can no longer mover rightward when its right end comes to abut against the second spring retainer 55b fixed in position.

When moving the piston 54 downward in FIG. 24 by turning the operation lever 20, the first spring retainer 55a is not moved because it is pressed to the bolt head 58a of the adjusting bolt 58, and the second spring retainer 55b, which is pressed to the stop ring 57 integrated with the piston 54, moves downward together with the piston 54 by overcoming the spring 56. The position where the second spring retainer 55b is pressed to the upper end of the first spring retainer 55a, or pressed to the upper end of the medium diameter part 58b of the adjusting bolt 58 (the step thereof between the medium diameter part 58b and the small diameter end 58c) is the leftward move limiting position of the piston 54.

Thus, in the neutral position holding mechanism 11d, the rotation control mechanism, which controls the moving range of the piston 54, that is, the pin 41 so as to determine the maximum limit rotating angle of the movable swash plate 21c or 22c, is configured by the both spring retainers 55a and 55c and the step of the adjusting bolt 58 between the medium diameter part 58b and small diameter end 58c thereof.

The pressure fluid supply control to the both hydraulic chambers across the piston 54 in the cylinder chamber 10c of the two automatic swash plate angle control valves 61 is same as in the foregoing neutral position holding mechanism 10c. Therefore, the states of the spring chambers 55a and 55b and spring 56 accompanying the motion of the piston 54 and the rotation control mechanism for controlling the motion of the piston 54 are same as the above-mentioned those actuation according to rotation of the operation lever 20, and the explanation is omitted herein.

Figure 26:
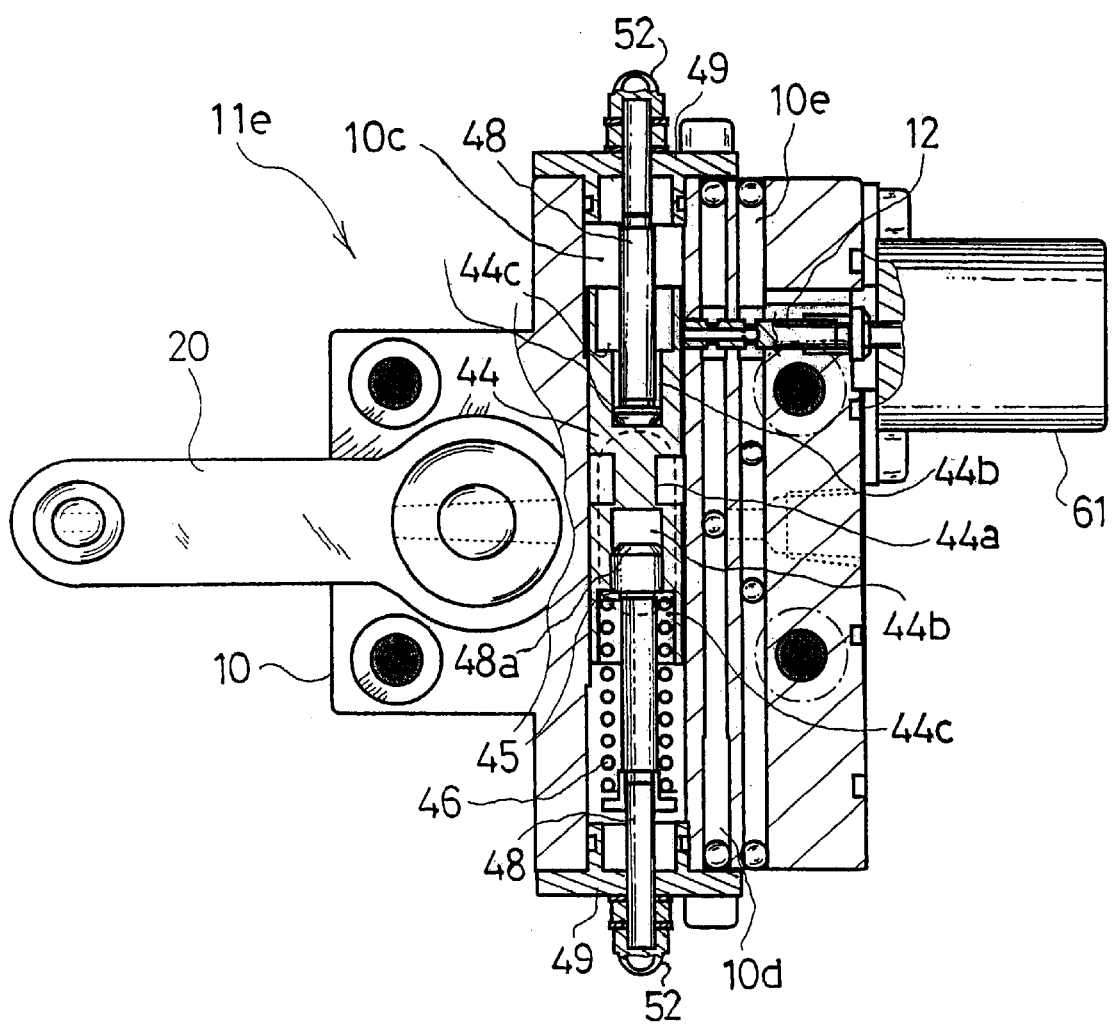
FIG. 26 is a side sectional view of each casing 10 supporting the operation lever 21, incorporating a neutral position holding mechanism 11*e*, and provided thereon with the automatic swash plate angle control valve 61.

Referring to FIG. 26, the configuration of a neutral position holding mechanism 11e and automatic swash plate angle control valve 61 for controlling the swash plate angle by way of the neutral position holding mechanism 11e will now be explained. Unless otherwise explained, the constituent members are same as in the neutral position holding mechanism 11c or 11d.

The neutral position holding mechanism 11e is substantially similar to the neutral position holding mechanism 11c shown in FIG. 20 and FIG. 21, except that the spring retainer 45, spring 46, and fixed spring retainer 50 at one side are omitted. That is, in the piston 44, an adjusting bolt 48 is supported across so as to be adjustable in position in the direction of axial center, between a bolt guide recess 44b formed at each side of the annular groove 44a fitted to the pin 41, and a cap 49 for blocking each open end of the cylinder chamber 10c, but the spring retainer 45, spring 46, and fixed spring retainer 50 are wound or provided around only one adjusting bolt 48 (lower side in FIG. 26).

Further, in FIG. 26, only one automatic swash plate angle control valve 61 is provided in the casing 10 so as to supply pressure fluid only to the upper hydraulic chamber above the piston 44 in the cylinder chamber 10c.

Therefore, as shown in FIG. 26, if the spring retainer 45, spring 46, and fixed spring retainer 50 are disposed at the lower side of the piston 44, the spring retainer 45 in the neutral holding state is pressed against the bolt head 48a of the adjusting bolt 48 (which is the lower one in FIG. 26) and against the step of the piston 44 between the lower side bolt guide recess 44b and lower side spring chamber 44c thereof by the biasing force of the spring 46, so that the piston 44 is forced upward.

The downward biasing force opposing the upward biasing force by this spring 46 is, in this embodiment, generated by the oil pressure of the pressure fluid from the pump port 10d supplied through the oil passages 12b and 12c of the spool 12 by the automatic swash plate angle control valve 61.

Therefore, in neutral state, a certain current is passed in the coil 64 of the automatic swash plate angle control valve 61 and is set to a proper value corresponding to the oil pressure of the upper side hydraulic chamber of the cylinder chamber 10c opposing the tip 12a of the spool 12 which can locate the annular groove 44a at a proper position while overcoming the biasing force of the spring 46.

The piston 44 can be moved by increasing or decreasing the supply of pressure fluid to the cylinder chamber 10 by turning the operation lever 20 or adjusting the current value to the coil 64 of the automatic swash plate angle control valve 61. When using the automatic swash plate angle control valve 61, the piston 44 can be moved downward from the neutral position in FIG. 26 in proportion to the increment of the pressure fluid supplied into the cylinder chamber 10c by setting the current value larger than the neutral setting current value, and moved upward from the neutral position in proportion to the decrement of the supplied pressure fluid by setting the current value smaller than the neutral setting value.

In FIG. 26, meanwhile, the bolt head 48a of the upper side adjusting bolt 48 is pressing to the deepest end of the right side bolt guide recess 44b of the piston 44, and it shows the maximum upward moving position of the piston 44, and it expresses the maximum swash plate angle of the movable swash plate 21c or 22c.

Or when moving the piston 44 downward by resisting the spring 46, the position of the deepest end of the lower side bolt guide recess 44b of the piston 44 pressing to the bolt head 48a of the lower side adjusting bolt 48 is defined as the maximum downward moving position of the piston 44 expressing the maximum swash plate angle to the opposite side of the movable swash plate 21c or 22c.

Thus, in the embodiment shown in FIG. 26, to hold the neutral position of the movable swash plate 21c or 22c, not only the spring biasing force, but also the hydraulic control by the automatic swash plate angle control valve 61 are utilized. Therefore, only one automatic swash plate angle control valve 61 is enough to be fitted to the casing 10, and only one spring 46 is disposed in the cylinder chamber 10c, so that the number of parts can be curtailed.

Figure 27:
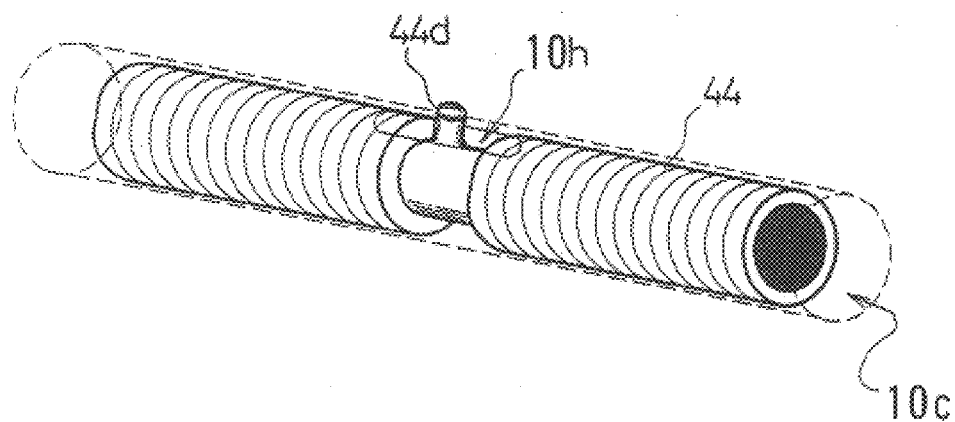
FIG. 27 is a perspective view of a piston 44 having a protrusion 44*d* for prevention of turning.
Figure 28:
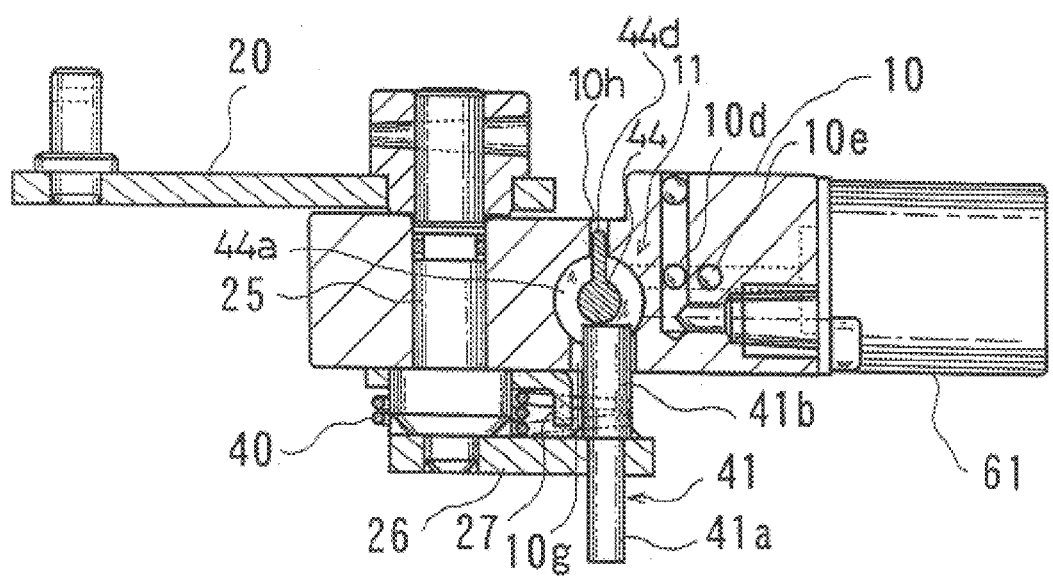
FIG. 28 is a side sectional view of the casing 10 supporting the operation lever 21, incorporating the neutral position holding mechanism 11, and provided thereon with the automatic swash plate angle control valve 61, showing a mode of use of the piston 44 shown in FIG. 27.

By preventing rotation of the piston 44 used in the neutral position holding mechanism 11c shown in FIG. 20, FIG. 21 or else, or in the neutral position holding mechanism 11e shown in FIG. 26, application of moment about the axial center of the piston 44 to the pin 41 fitted into the annular groove 44a may be prevented so as to make the interlocked motion of the piston 44 and spool 72 through the pin 41 smooth. Then, as shown in FIG. 27 and FIG. 28, as rotation preventive means of the piston 44, a protrusion 44d in the radial direction of the piston 44 is formed from a part of the annular groove 44a. The casing 10 is formed therein with a guide groove 10h of a width nearly same as the diameter of the protrusion 44d. The protrusion 44d is slidably fitted into the guide groove 10h. When moving in the direction of axial center of the piston 44, the protrusion 44d accurately moves linearly in the direction of the axial center of the piston 44 within the guide groove 10h, whereby the piston 44 does not rotate in the direction of outer circumference, but accurately moves linearly. Therefore, excessive force due to rotation about the axial center of the piston 44 will not be applied to the pin 41 (second pin portion 41b) inserted in the annular groove 44a.

Alternatively, the pin 41 itself may be integrated with the piston 44 so as to guide the pin 41 itself to move linearly along the direction of the axial center of the piston 44. In a piston 44' shown in FIG. 29, instead of the annular groove 44a, a hole of an aperture nearly same as a pin 41' is pierced in the radial direction of the piston 44', and the pin 41' replacing the pin 41 is fitted into this hole. That is, the pin 41' is fitted to be integral with the piston 44'. Or the pin portion corresponding to the pin 41' may be integrally formed of the piston 44' so as to project. Further, in the casing 10, instead of the guide groove 10g for allowing revolution of the pin 41 about the rotation fulcrum shaft 25, a guide groove 10i having a width nearly same as the diameter of the pin 41' may be provided as shown in FIG. 30 and FIG. 31.

Thus, by integrally forming the piston 44' and the pin 41' as the spool operating member, the strength as a rigid body is heightened, and further, by guiding the pin 41' by the guide groove 10i, deviation in the sliding direction occurring in the fitting portion of the annular groove 44a of the piston 44 and the pin 41' as shown in FIG. 20 or else or deviation due to rotation about the shaft can be eliminated, so that the pin 41' can be accurately moved linearly, thereby enhancing the power transmission efficiency to the spool 72.

Meanwhile, if the pin 41', which linearly moves integrally together with the linear motion of the piston 44', is fixed in the support arm 26 rotating about the rotation fulcrum shaft 25, shift of the pin 41' and piston 44' is badly prevented. Then, as shown in FIG. 30, by removing the support arm 26, only the torsion spring 40 and interlocking arm 27 as over-stroke absorbing mechanism are disposed. Alternatively, as shown in FIG. 31, by removing the torsion spring 40 and interlocking arm 27 as over-stroke absorbing mechanism, the support arm 26 may be replaced by a fork 106 relatively rotatably provided on the rotation fulcrum shaft 25, and the pin 41' may be enclosed by this fork 106 so that the pin 41' integral with the piston 44' may move linearly.

Figure 29:
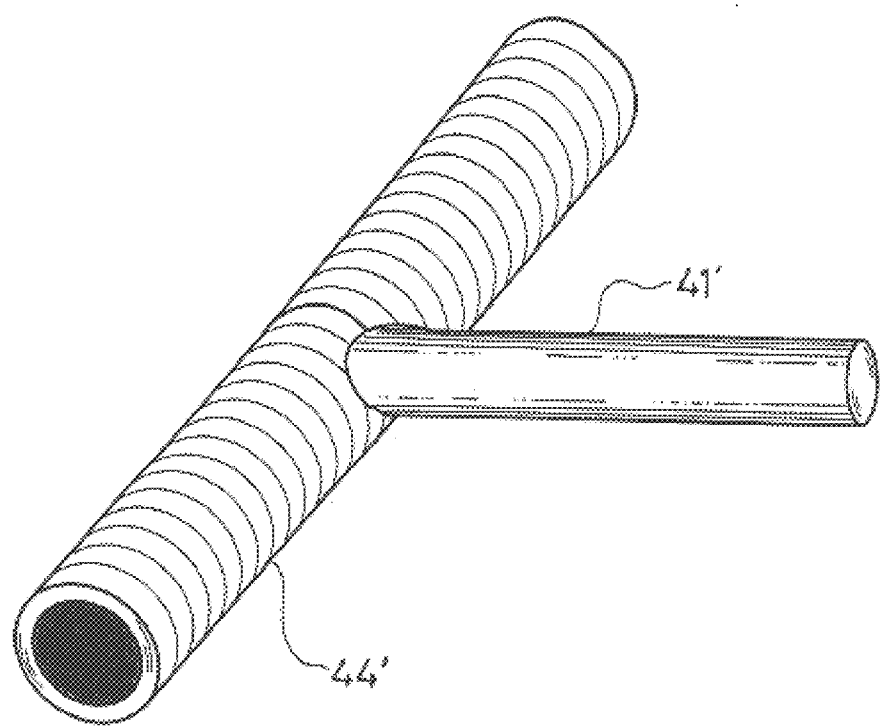
FIG. 29 is a perspective view of a piston 44' integrally provided with a pin serving as a spool operating member.
Figure 30:
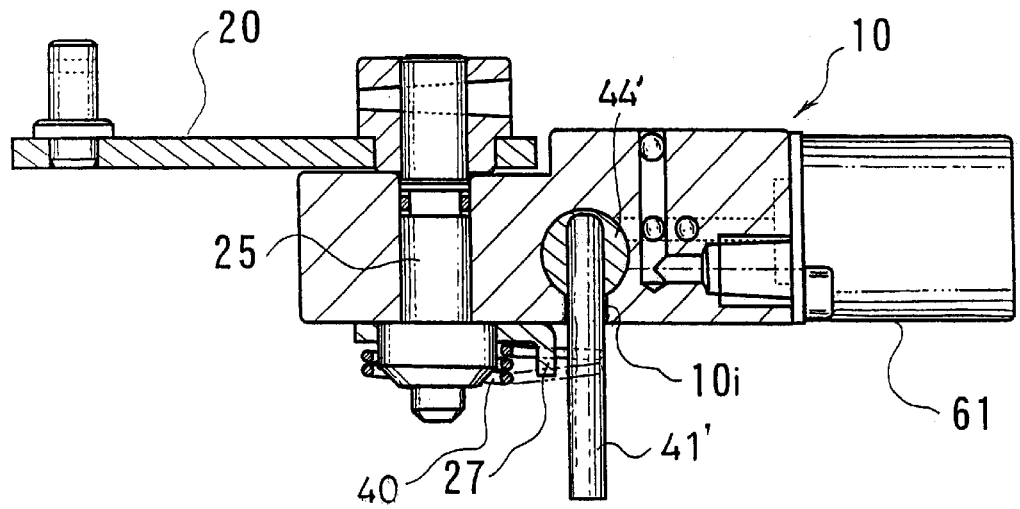
FIG. 30 is a side sectional view of the casing 10 supporting the operation lever 21, incorporating the neutral position holding mechanism 11, and provided thereon with the automatic swash plate angle control valve 61, showing a mode of use of the piston 44' shown in FIG. 29.
Figure 31:
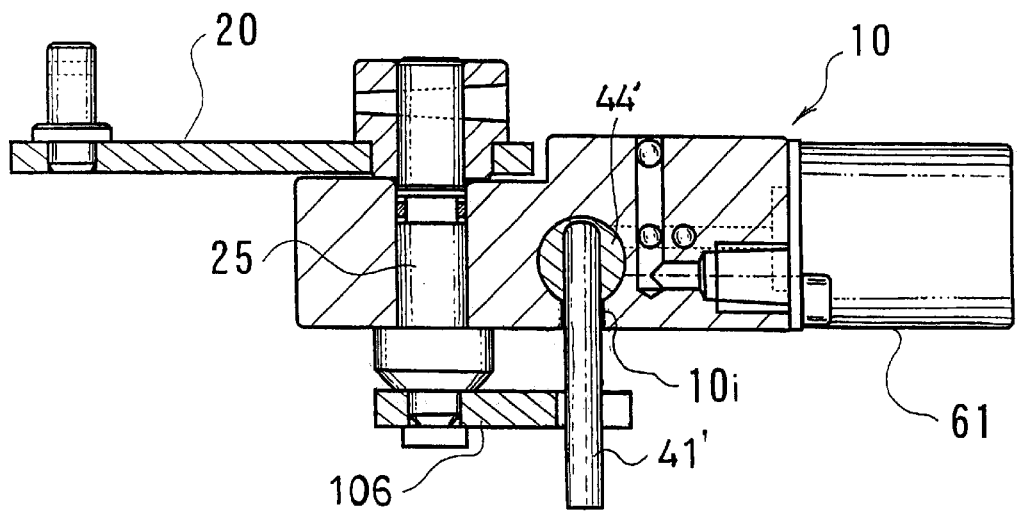
FIG. 31 is a side sectional view of the casing 10 supporting the operation lever 21, incorporating the neutral position holding mechanism 11, and provided thereon with the automatic swash plate angle control valve 61, showing another mode of use of the piston 44' shown in FIG. 29.

The piston rotation preventive mechanism in FIG. 27 and FIG. 28 and the integrated structure of the piston and pin in FIG. 29 to FIG. 31 may be also applied to the piston 54 used in the neutral position holding mechanism 11d shown in FIG. 24.

The swash plate controlling hydraulic servo mechanism comprising the casing 10, to which the solenoid proportional valve as the automatic swash plate angle control valve 61 is attached, and in which the neutral position holding mechanism 11 (any one of 11c, 11d, 11e) hydraulically controlled by the solenoid proportional valve is disposed, may be applied not only to the respective hydraulic pump and motor of an HST such as the HST 2 wherein both the hydraulic pump and motor are of the variable displacement type, but also to the variable displacement hydraulic pump or motor of an HST such as the HST 1 wherein either the hydraulic pump or motor is of the variable displacement type. On the other hand, the hydraulic servo mechanism including the neutral position holding mechanism 11a or 11b may be provided to both the hydraulic pump and hydraulic motor in an HST such as the HST 2 using the variable replacement type in both hydraulic pump and hydraulic motor.

INDUSTRIAL APPLICABILITY

As described herein, the invention relates to a hydraulic continuously variable transmission of a type for controlling the position of the swash plate by a hydraulic servo mechanism, and when applied, for example, in a tractor or other vehicle, in particular, in addition to manual operation, automatic operation is enabled depending on the situation of engine load or vehicle wheel load, and accurate control is realized, so that a swash plate angle control mechanism of compact design and low cost is presented.

What is claimed is:

1. A swash plate angle control mechanism of hydraulic continuously variable transmission, comprising:

a body housing of the hydraulic continuously variable transmission;

a hydraulic servo mechanism disposed within said body housing to control the swash plate angle of the hydraulic continuously variable transmission;

a manual operation member disposed outside of said body housing to operate said hydraulic servo mechanism;

a casing disposed between said manual operation member and said body housing;

a neutral position holding mechanism installed in said casing to hold the neutral position of a movable swash plate; and a rotation control mechanism also installed in said casing to control the maximum rotating angle said movable swash plate, wherein said hydraulic servo mechanism is controlled by said neutral position holding mechanism and said rotation control mechanism.

2. The swash plate angle control mechanism of hydraulic continuously variable transmission according to claim 1, further comprising:

an over-stroke absorbing mechanism installed in an area ranging from the inside of said casing to the inside of said body housing to absorb the over-stroke of said manual operation member.

3. The swash plate angle control mechanism of hydraulic continuously variable transmission according to claim 1, further comprising:

a spool as a hydraulic valve provided in said hydraulic servo mechanism;

a spool operating member disposed in an area ranging from the inside of said casing to the inside of said body housing movably integrally with said spool by operation of said manual operation member;

a positioning member of a substantially same width as said spool operating member disposed in said casing; and a pair of pressing members, wherein said pair of pressing members receive biasing forces in mutually opposite directions so as to clamp both said positioning member and said spool operating member from both sides, thereby constituting said neutral position holding mechanism for holding said spool operating member at a position corresponding to the neutral position of said movable swash plate.

4. The swash plate angle control mechanism of hydraulic continuously variable transmission according to claim 3, wherein said pressing member is a spring retainer which receives a spring biasing force and is movable close to and apart from said positioning member.

5. The swash plate angle control mechanism of hydraulic continuously variable transmission according to claim 4, wherein said casing is filled with fluid, and wherein, in said each spring retainer, an orifice is formed for passing fluid between the disposing space of said each spring and the disposing space of said positioning member.

6. The swash plate angle control mechanism of hydraulic continuously variable transmission according to claim 3, further comprising:

a rod having said positioning member provided as a constituent member of said neutral position holding mechanism, wherein said pressing member is disposed movably along the axial center direction of said rod; and a step serving as said rotation control mechanism formed in the rod so as to be able to abut against said pressing member for defining the move of said pressing member in a direction remote from the positioning member against the biasing force.

7. The swash plate angle control mechanism of hydraulic continuously variable transmission according to claim 6, wherein, in said neutral position holding mechanism, said rod is usually fixed in position, and when adjusting the position of said positioning member at the time of clamping at both pressing members by said biasing force from both sides, said rod can be moved in the axial center direction by operation from outside of said casing.

8. The swash plate angle control mechanism of hydraulic continuously variable transmission according to claim 3, said casing being filled with pressure oil, further comprising:

a solenoid proportional valve provided onto said casing, wherein said solenoid proportional valve controls the supply control of pressure oil to said neutral position holding mechanism so as to control the move of said spool operating member.

9. The swash plate angle control mechanism of hydraulic continuously variable transmission according to claim 8, said neutral position holding mechanism comprising:

a piston fitting with said spool operating member, said piston being disposed in said casing; and a pair of biasing members disposed at both sides of the piston, said pair of biasing members being disposed in said casing, wherein, by holding said piston by the biasing force from both sides by said pair of biasing members, said spool operating member is held at a position corresponding to the neutral position of said movable swash plate, and wherein a pair of said solenoid proportional valves are provided so as to control supply of pressure oil to respective hydraulic chambers at both sides of said piston.

10. The swash plate angle control mechanism of hydraulic continuously variable transmission according to claim 9, wherein guide means is further provided to allow said piston to move only along the direction of the axial center.

11. The swash plate angle control mechanism of hydraulic continuously variable transmission according to claim 9, wherein said spool operating member is disposed integrally with said piston.

12. The swash plate angle control mechanism of hydraulic continuously variable transmission according to claim 8, said neutral position holding mechanism comprising:

a piston fitting with said spool operating member, said piston being disposed in said casing; and a biasing member disposed at one side of the piston, said biasing member being disposed in said casing, wherein supply of pressure oil to a hydraulic chamber formed at the other side of said piston is controlled by said sole solenoid proportional valve, and wherein, by holding said piston by equilibrium between the biasing force of said biasing member at said one side thereof and the oil pressure of the pressure oil at said other side thereof, said spool operating member is held at a position corresponding to the neutral position of said movable swash plate.

13. The swash plate angle control mechanism of hydraulic continuously variable transmission according to claim 1, wherein said neutral position holding mechanism is formed integrally as a cartridge, and is detachably installed in said casing.

14. The swash plate angle control mechanism of hydraulic continuously variable transmission according to claim 1, wherein both the hydraulic pump and hydraulic motor of said hydraulic continuously variable transmission are of variable displacement type, and said hydraulic servo mechanism is for controlling the movable swash plate angle of the hydraulic pump and the hydraulic motor.

* * * * *

UNITED STATES PATENT AND TRADEMARK OFFICE
CERTIFICATE OF CORRECTION

PATENT NO. : 6,684,634 B1
DATED : February 3, 2004
INVENTOR(S) : Kunihiko Sakamoto It is certified that error appears in the above-identified patent and that said Letters Patent is hereby corrected as shown below:

<u>Title page,</u>
Item [22], PCT filed, please change the PCT filing date to -- September 1, 2000 --.

Signed and Sealed this

Eighteenth Day of May, 2004

JON W. DUDAS
*Acting Director of the United States Patent and Trademark Office*